United States Patent
Lee et al.

(10) Patent No.: US 10,993,263 B2
(45) Date of Patent: Apr. 27, 2021

(54) METHOD FOR EXECUTING V2X COMMUNICATION EXECUTED BY V2X TERMINAL IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/578,009

(22) Filed: Sep. 20, 2019

(65) Prior Publication Data

US 2020/0015272 A1    Jan. 9, 2020

Related U.S. Application Data

(63) Continuation of application No. PCT/KR2018/003384, filed on Mar. 22, 2018.

(Continued)

(51) Int. Cl.
*H04W 74/08* (2009.01)
*H04W 4/40* (2018.01)
(Continued)

(52) U.S. Cl.
CPC ......... *H04W 74/0816* (2013.01); *H04W 4/40* (2018.02); *H04W 8/005* (2013.01);
(Continued)

(58) Field of Classification Search
CPC ........ H04L 5/0082; H04W 4/70; H04W 4/80; H04W 72/04; H04W 72/042;
(Continued)

(56) References Cited

U.S. PATENT DOCUMENTS

2015/0334760 A1    11/2015    Sartori et al.
2017/0019887 A1    1/2017    Jiang et al.
(Continued)

FOREIGN PATENT DOCUMENTS

WO    2016085210 A1    6/2016
WO    2016182295 A1    11/2016

OTHER PUBLICATIONS

Ericsson et al., "Sidelink SPS Configuration", R2-168702, 3GPP TSG-RAN WG2 #96, Reno, Nevada, USA, Nov. 14-18, 2016, see sections 1, 2.1.

(Continued)

*Primary Examiner* — Harun Chowdhury
(74) *Attorney, Agent, or Firm* — Dentons US LLP

(57) ABSTRACT

The present invention provides a method for executing physical sidelink control channel (PSCCH) transmission executed by a vehicle-to-X (V2X) terminal in a wireless communication system, the method comprising: receiving sidelink semi-persistent scheduling (SPS) configuration information, wherein the sidelink SPS configuration information includes at least one or more sidelink SPS configuration indexes, and SPS periods of the respective at least one or more sidelink SPS configuration indexes; receiving downlink control information including activation information, wherein the activation information indicates a specific SPS configuration index, among the at least one or more sidelink SPS configuration indexes, that is activated; and executing PSCCH transmission on the basis of the sidelink SPS configuration information and the downlink control information, wherein, when executing the PSCCH transmission, the terminal configures, as the SPS period value of the specific SPS configuration index, a resource reservation field value on the PSCCH.

7 Claims, 15 Drawing Sheets

Related U.S. Application Data

(60) Provisional application No. 62/634,922, filed on Feb. 25, 2018, provisional application No. 62/570,116, filed on Oct. 10, 2017, provisional application No. 62/475,211, filed on Mar. 22, 2017.

(51) Int. Cl.
| | |
|---|---|
| *H04W 76/27* | (2018.01) |
| *H04W 8/00* | (2009.01) |
| *H04W 28/02* | (2009.01) |
| *H04W 28/26* | (2009.01) |
| *H04W 72/04* | (2009.01) |
| *H04W 72/12* | (2009.01) |

(52) U.S. Cl.
CPC ....... *H04W 28/0289* (2013.01); *H04W 28/26* (2013.01); *H04W 72/042* (2013.01); *H04W 72/121* (2013.01); *H04W 72/1278* (2013.01); *H04W 76/27* (2018.02)

(58) Field of Classification Search
CPC . H04W 72/10; H04W 72/12; H04W 28/0289; H04W 4/40; H04W 8/005; H04W 28/26; H04W 72/1278; H04W 74/0816
USPC .......................... 370/252, 329, 336; 455/450
See application file for complete search history.

(56) References Cited

U.S. PATENT DOCUMENTS

| | | |
|---|---|---|
| 2017/0280469 A1 | 9/2017 | Park et al. |
| 2017/0289733 A1* | 10/2017 | Rajagopal ........... H04W 72/042 |
| 2018/0206140 A1* | 7/2018 | Panteleev ........... H04W 72/042 |
| 2018/0242190 A1* | 8/2018 | Khoryaev ......... H04W 28/0289 |
| 2019/0313279 A1* | 10/2019 | Li ........................ H04W 72/12 |
| 2019/0313375 A1* | 10/2019 | Loehr ................... H04W 72/04 |

OTHER PUBLICATIONS

ZTE et al., "Discussion on DCI format of V2X SPS scheduling", R1-1701620, 3GPP TSG RAN WG1 Meeting #88, Athens, Greece, Feb. 13-17, 2017, see section 2.

LG Electronics, "Remaining issues on multiplexing V2V with other signals/channels", R1-1702400, 3GPP TSG RAN WG1 Meeting #88, Athens, Greece, Feb. 13-17, 2017, see pp. 4-10.

Ericsson, "Support for smaller resource reservation periods in V2X", R1-1703034, 3GPP TSG RAN WG1 Meeting #88, Athens, Greece, Feb. 13-17, 2017, see sections 1-4.

NEC, "Load balancing via dynamic resource sharing for multiple carriers and pools", 3GPP TSG RAN WG1 Meeting #87, Nov. 14-18, 2016, R1-1611722.

Samsung, "Discussion on congestion control", 3GPP TSG RAN WG1 #87, Nov. 14-18, 2016, R1-1612392.

Ericsson, "Congestion Control for Sidelink-based V2X", 3GPP TSG-RAN WG2 #97, Feb. 13-17, 2017, R2-1700929.

\* cited by examiner

METHOD FOR EXECUTING V2X COMMUNICATION EXECUTED BY V2X TERMINAL IN WIRELESS COMMUNICATION SYSTEM, AND TERMINAL USING SAME

CROSS-REFERENCE TO RELATED APPLICATIONS

Pursuant to 35 U.S.C. § 119(e), this application is a continuation of International Application PCT/KR2018/003384, with an international filing date of Mar. 22, 2018, which claims the benefit of U.S. Provisional Patent Application Nos. 62/475,211, filed on Mar. 22, 2017, 62/570,116, filed on Oct. 10, 2017 and 62/634,922, filed on Feb. 25, 2018, the contents of which are hereby incorporated by reference herein in its entirety.

BACKGROUND

Field

The present document relates to wireless communication, and more particularly, to a method for performing V2X communication performed by a V2X terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

The D2D communication described above may be extended and applied to signal transmission/reception between vehicles, and the communication related to a vehicle is referred to as VEHICLE-TO-EVERYTHING (V2X) communication, particularly. In the term V2X, the term 'X' means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be denoted as V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (ex) RSU IS A TRANSPORTATION INFRASTRUCTURE ENTITY (ex) AN ENTITY TRANSMITTING SPEED NOTIFICATIONS) IMPLEMENTED IN AN eNB OR A STATIONARY UE)) (V2I/N), and the like. The (V2P communication related) device owned by a pedestrian (or a person) is named as "P-UE", and the (V2X communication related) device installed on a VEHICLE is named as "V-UE". In the present document, the term 'ENTITY' may be interpreted to at least one of P-UE, V-UE and RSU (/NETWORK/INFRASTRUCTURE).

Previously, it has not been assumed the case that a MODE 3 V2X terminal and a MODE 4 V2X terminal are coexisted in a V2X resource pool. That is, previously, it is assumed that there is a resource pool for MODE 3, and separately, there is a resource pool for MODE 4. And it is assumed that the MODE 3 V2X terminal performs a V2X communication in a resource pool for MODE 3, and the MODE 4 V2X terminal performs a V2X communication in a resource pool for MODE 4.

Owing to this, previously, when the MODE 3 V2X terminal performs a V2X communication in a resource pool for MODE 3, the MODE 3 V2X terminal does not consider the situation in which the MODE 4 V2X terminal are influenced by its own communication seriously.

In the future V2X communication, it is considered the situation in which terminals operating in different types of V2X communication MODEs in a V2X resource pool. That is, in the future V2X communication, on a specific resource pool, the situation may occur that the V2X terminal of MODE 3 and the V2X terminal of MODE 4 are coexisted.

Accordingly, the present document is to provide a method for a MODE 3 terminal and a MODE 4 terminal perform communication efficiently.

SUMMARY

Accordingly, an object of the present document is to provide a method for performing V2X communication performed by a V2X terminal in a wireless communication system and a terminal using the method.

In an aspect, a method for performing a physical sidelink control channel (PSCCH) transmission in a wireless communication system is provided. The method performed by a vehicle-to-X (V2X) User Equipment (UE) may comprise receiving Sidelink semi persistent scheduling (SPS) configuration information, wherein the Sidelink SPS configuration information includes at least one Sidelink SPS configuration index and an SPS period for each of the at least one Sidelink SPS configuration index; receiving downlink control information including activation information, wherein the activation information indicates an activated specific SPS configuration index among the at least one Sidelink SPS configuration index; and performing the PSCCH transmission based on the Sidelink SPS configuration information and the downlink control information, wherein the UE set a resource reservation field value on the PSCCH to an SPS period value for the specific SPS configuration index, when performing the PSCCH transmission.

The Sidelink SPS configuration information may be received from a base station through radio resource control (RRC) signaling.

The downlink control information may be received from a base station, and the downlink control information may be downlink control information (DCI) format 5A.

The UE may perform the PSCCH transmission based on the SPS period for the specific SPS configuration index.

The downlink control information may further include a size of frequency resource used when performing the PSCCH transmission, a position of frequency resource used when performing the PSCCH transmission or information for a time gap between an initial transmission and a retransmission.

The resource reservation field may be included in sidelink control information (SCI).

The V2X UE may be a MODE 3 UE, and the MODE 3 UE may be a UE in which scheduling information for a V2X message is controlled by a base station on a V2X resource pool.

The V2X UE may transmit the PSCCH to another V2X UE.

The V2X UE may receive information indicating whether the resource reservation field value on a PSCCH is set to the SPS period value for the specific SPS configuration index.

The V2X UE may perform the PSCCH transmission based on whether a V2X UE operating in different mode from the V2X UE is coexisted in a resource pool of the UE.

The V2X UE may perform channel busy ratio (CBR) measurement on the resource pool and transmits information for the measured CBR to a base station.

The V2X UE may perform a sensing operation on the resource pool and transmits a result for the sensing to a base station.

The V2X UE may receive information for a new resource from the base station in response to the transmission of the result for the sensing.

The V2X UE operating in different mode may be a MODE 4 UE, and the MODE 4 UE may be a UE that independently determines V2X message related scheduling information in the resource pool.

In another aspect, a vehicle-to-X (V2X) User Equipment (UE) is provided. The UE may comprise a transceiver for transmitting and receiving a radio signal; and a processor operating with being combined with the RF transceiver, wherein the processor is configured to perform: receive Sidelink semi persistent scheduling (SPS) configuration information, wherein the Sidelink SPS configuration information includes at least one Sidelink SPS configuration index and an SPS period for each of the at least one Sidelink SPS configuration index; receive downlink control information including activation information, wherein the activation information indicates an activated specific SPS configuration index among the at least one Sidelink SPS configuration index; and perform the PSCCH transmission based on the Sidelink SPS configuration information and the downlink control information, wherein the UE set a resource reservation field value on the PSCCH to an SPS period value for the specific SPS configuration index, when performing the PSCCH transmission.

According to the present document, a MODE 4 terminal (or MODE 3 terminal) may detect a resource which is periodically occupied by a MODE 3 terminal. At this time, the MODE 4 terminal (or MODE 3 terminal) may select resource to perform a V2X communication after removing the resource which is periodically occupied by the MODE 3 terminal, and accordingly, the possibility that a V2X communication of the MODE 4 terminal (or MODE 3 terminal) is influenced by a V2X communication of the MODE 3 terminal (or MODE 4 terminal) become lowed.

DESCRIPTION OF EXEMPLARY EMBODIMENTS

A definition of a term and an abbreviation of a term described in this specification to be described hereinafter may be defined in 3gpp TS 36 series unless there is separate description.

Figure 1:
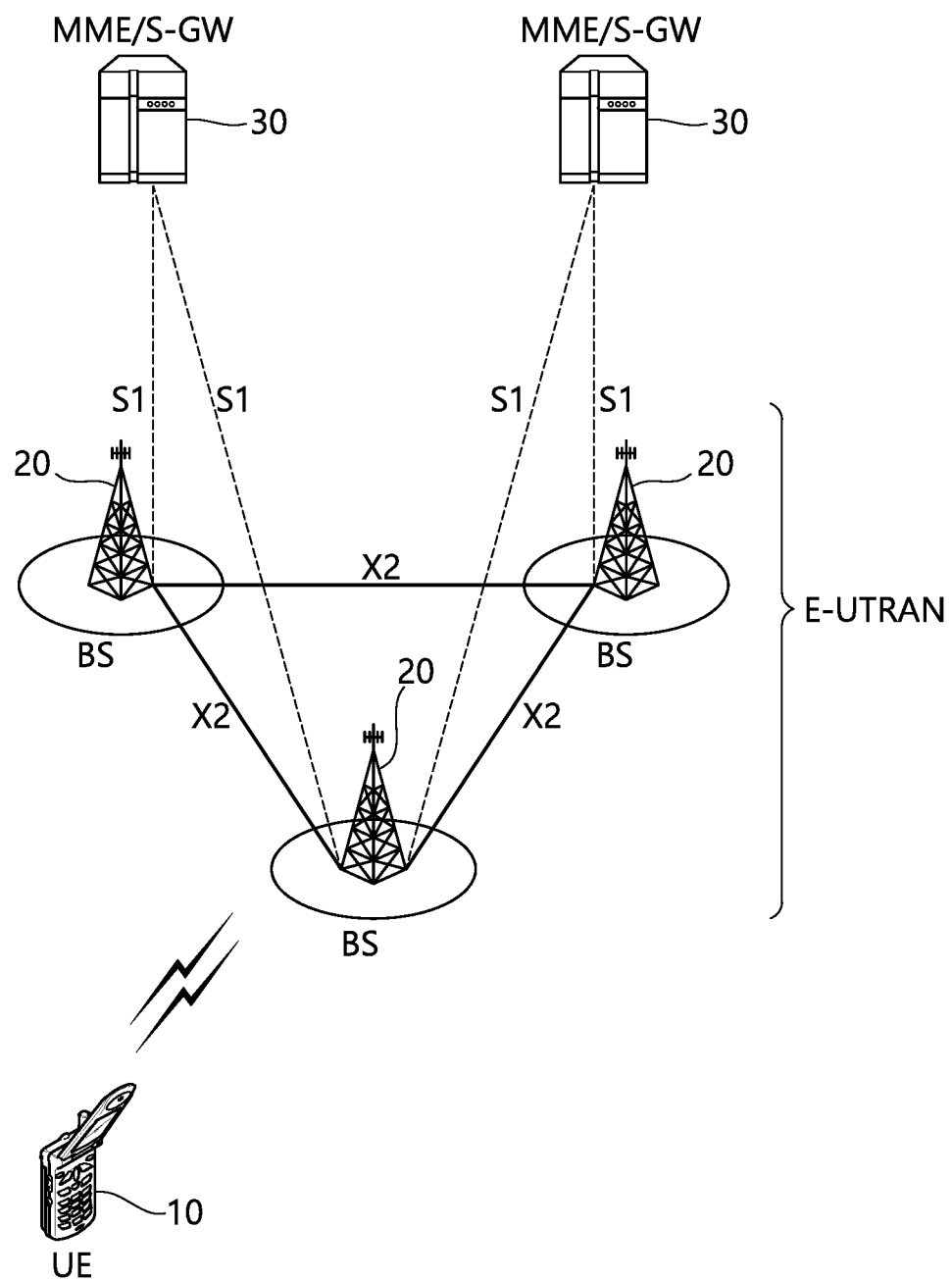
FIG. 1 shows a wireless communication system to which the present document is applied.

FIG. 1 shows a wireless communication system to which the present document is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
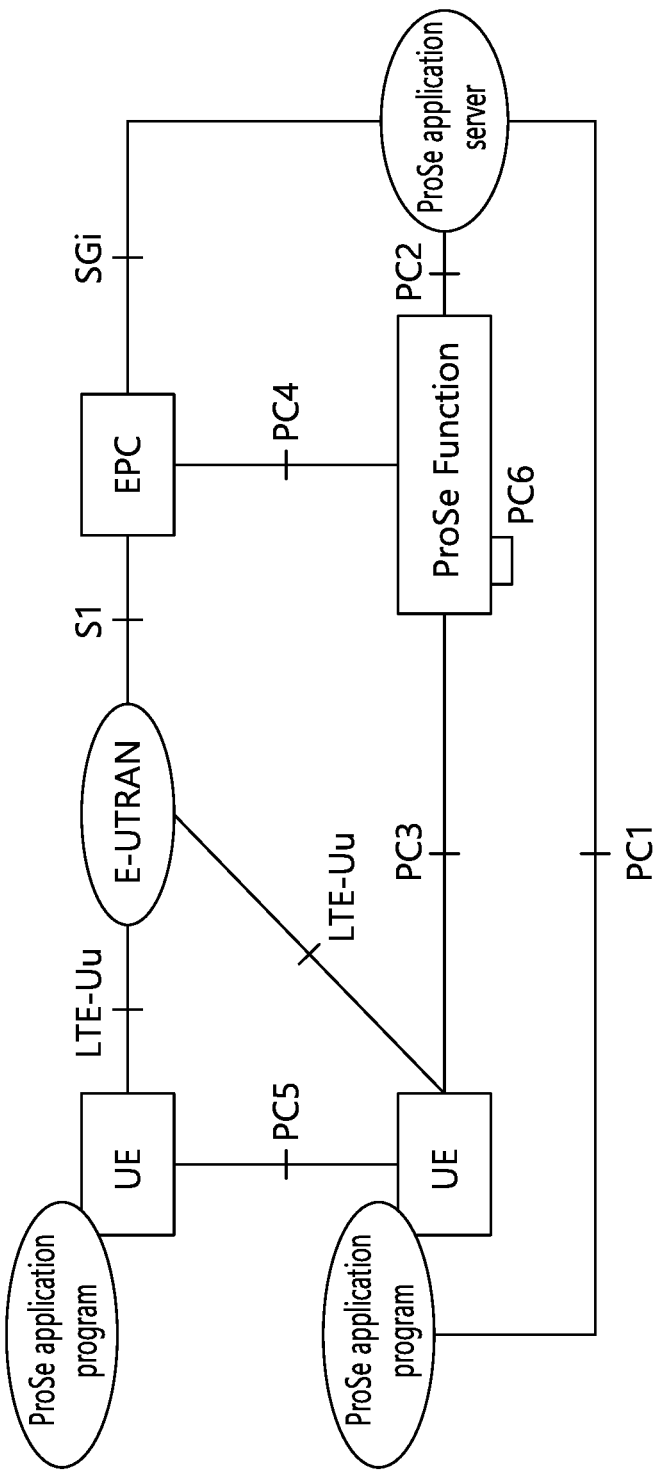
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
 Interworking via a reference point towards the 3rd party applications
 Authorization and configuration of the UE for discovery and direct communication)
 Enable the function of the EPC level ProSe discovery
 ProSe related new subscriber data and handling of data storage, and also handling of ProSe identities
 Security related function
 Provide control towards the EPC for policy related function
 Provide function for charging (via or outside of EPC, e.g., offline charging))

Hereinafter, a reference point and a reference interface will be described in a reference structure for the ProSe.
 PC1: a reference point between a ProSe application program in the terminal and a ProSe application program in a ProSe application server. The PC1 is used to define signaling requirements in an application level.
 PC2: is a reference point between the ProSe application server and a ProSe function. The PC2 is used to define an interaction between the ProSe application server and a ProSe function. An application data update of a ProSe database of the ProSe function may be an example of the interaction.
 PC3: is a reference point between the terminal and the ProSe function. The PC3 is used to define an interaction between the terminal and the ProSe function. Configuration for ProSe discovery and communication may be an example of the interaction.
 PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
 PC5: is a reference point to use control/user plane for discovery, communication, and relay between terminals, and 1:1 communication.
 PC6: is a reference point to use a function such as ProSe discovery between users included in different PLMNs.
 SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
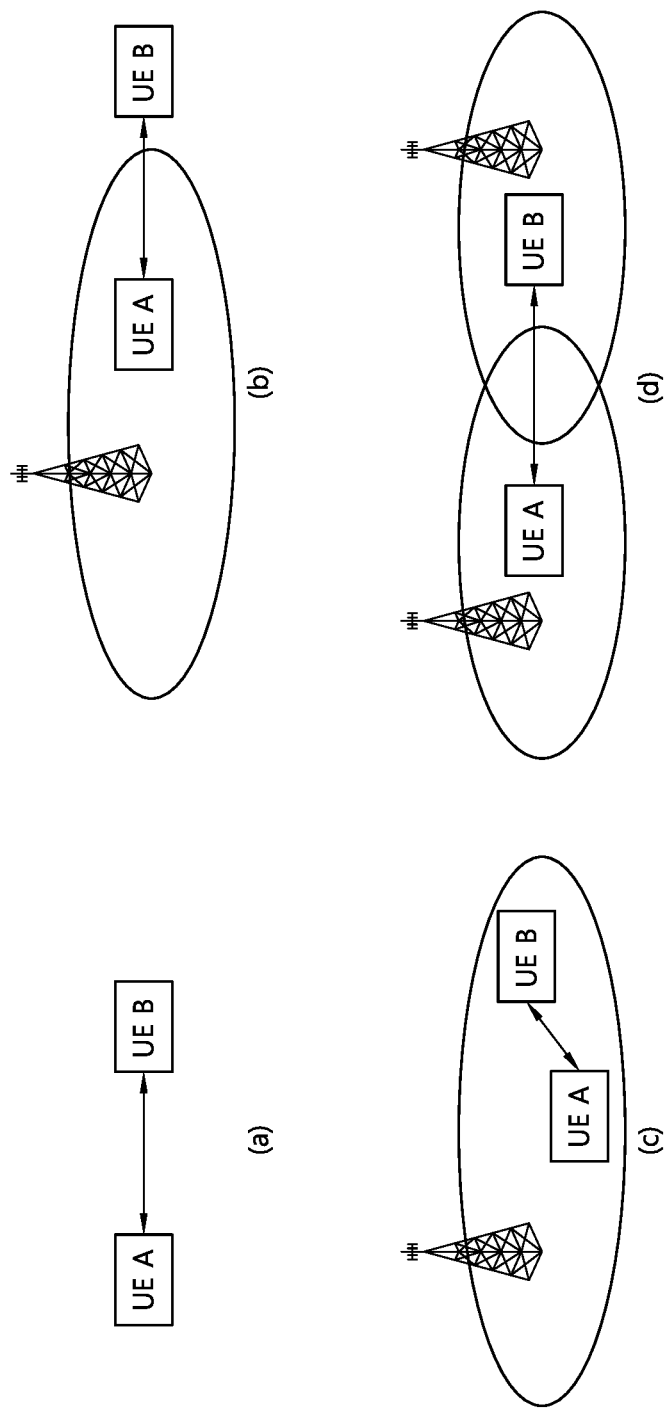
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.
 Source layer-2 ID: The source layer-2 ID identifies a sender of a packet in a PC 5 interface.
 Purpose layer-2 ID: The purpose layer-2 ID identifies a target of a packet in a PC 5 interface.
 SA L1 ID: The SA L1 ID represents an in an ID in a scheduling assignment (SA) in the PC 5 interface.

Figure 4:
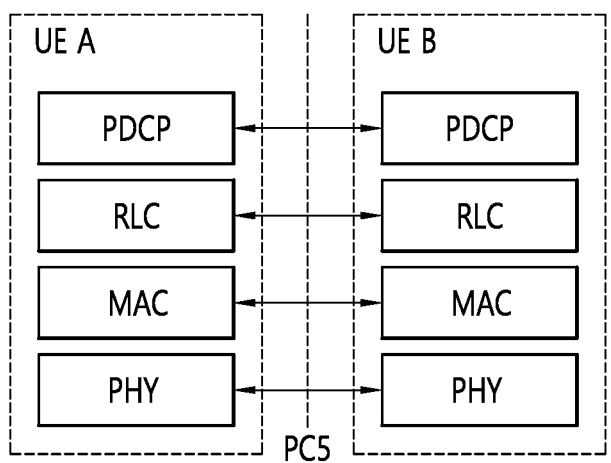
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
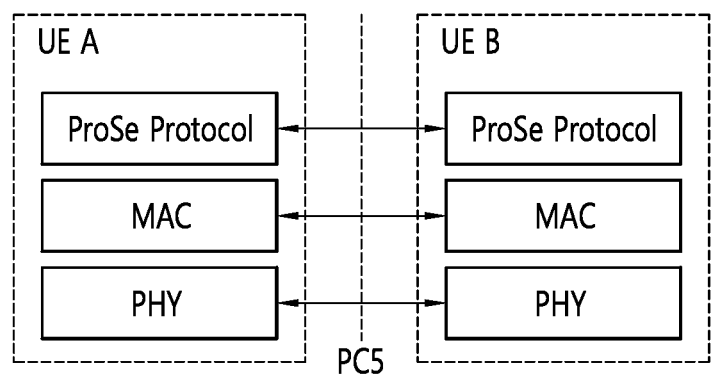
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<DCI (Downlink Control Information) Format>

Meanwhile, a use of DCI format may be classified as represented in Table 1 below.

TABLE 1

| DCI format | Contents |
| --- | --- |
| DCI format 0 | Used for PUSCH scheduling |
| DCI format 1 | Used for scheduling one PDSCH codeword |
| DCI format 1A | Used for compact scheduling of one PDSCH codeword and random-access process |
| DCI format 1B | Used for compact scheduling of one PDSCH codeword having precoding information |
| DCI format 1C | Used for very compact scheduling of one PDSCH |
| DCI format 1D | Used for compact scheduling of one PDSCH codeword having precoding and power offset information |
| DCI format 2 | Used for PDSCH scheduling of UEs configured in Closed-loop spatial multiplexing mode |
| DCI format 2A | Used for PDSCH scheduling of UEs configured in open-loop spatial multiplexing mode |
| DCI format 2B | DCI format 2B is used for resource allocation for dual-layer beamforming of a PDSCH. |
| DCI format 2C | DCI format 2C is used for resource allocation for Closed-loop SU-MIMO or MU-MIMO operation up to 8 layers. |
| DCI format 2D | DCI format 2D is used for resource allocation for up to 8 layers. |
| DCI format 3 | Used for transmitting TPC command of PUCCH and PUSCH having 2-bits power adjustments |

TABLE 1-continued

| DCI format | Contents |
| --- | --- |
| DCI format 3A | Used for transmitting TPC command of PUCCH and PUSCH having 1-bit power adjustments |
| DCI format 4 | Used for PUSCH scheduling of UL cell operating in multi-antenna port transport mode |

<V2X (VEHICLE-TO-X) Communication>

As described above, D2D operation generally provides various advantages in that it supports signal transmission and reception between devices adjacent to each other. For example, a D2D UE may perform data communication with a high transmission rate and low latency. Also, D2D operation may disperse traffic concentrated at a base station, and if a UE performing a D2D operation acts as a relay, D2D operation may extend the coverage of the base station. As an extension of the D2D communication, vehicle-related communication including signal transmission and reception between vehicles is particularly called Vehicle-to-X (V2X) communication.

In one example, the 'X' in the V2X represents pedestrian (communication between a vehicle and a device carried by individual (for example, handheld UE carried by a pedestrian, cyclist, driver, or passenger), where, in this case, V2X may be expressed by V2P), vehicle (communication between vehicles, V2V), infrastructure/network (communication between a vehicle and a roadside unit (RSU)/network, where RSU is a transportation infrastructure entity, for example, an entity transmitting speed notifications implemented in an eNB or a stationary UE, V2I/N). Here, as an example, in the term VEHICLE-TO-X (V2X), the term 'X' means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be denoted as V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (ex) RSU IS A TRANSPORTATION INFRASTRUCTURE ENTITY (ex) AN ENTITY TRANSMITTING SPEED NOTIFICATIONS) IMPLEMENTED IN AN eNB OR A STATIONARY UE)) (V2I/N), and the like. In addition, in one example, for the convenience of description of the proposed method, a (V2P communication-related) device carried by a pedestrian (or person) is called a "P-UE" while a (V2X communication-related) device installed in a vehicle is called a "V-UE". Also, in one example, the term 'entity' in this document may be interpreted as P-UE, V-UE or RSU (/network/infrastructure).

A V2X UE may perform message (or channel) transmission on a predefined (or signaled) resource pool. Here, a resource pool may refer to a predefined resource(s) which enables a UE to perform a V2X operation (or which is capable of performing a V2X operation). At this time, a resource pool may also be defined in terms of time-frequency aspect.

Meanwhile, various types of V2X transmission resource pools may be defined.

Figure 6:
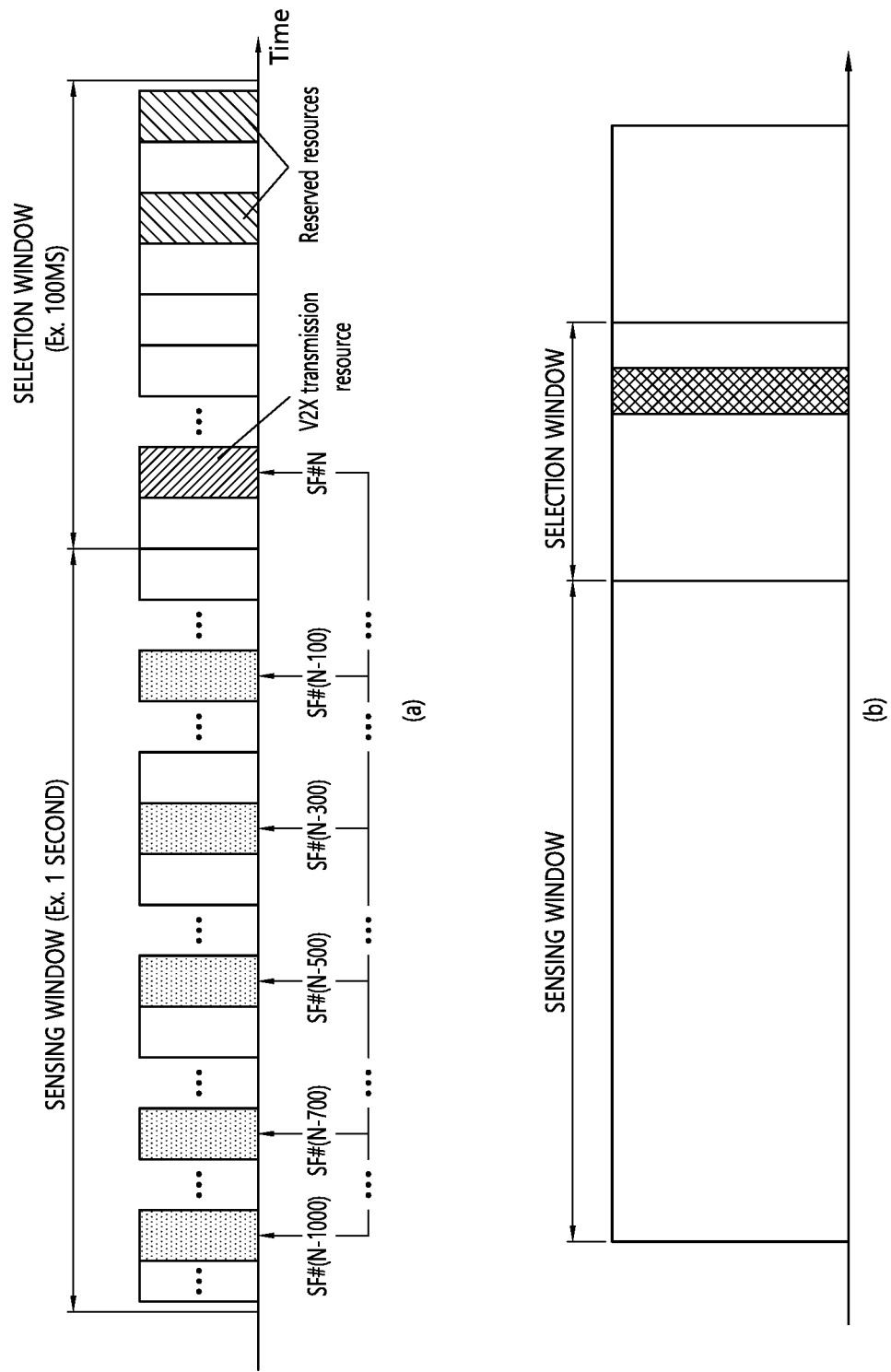
FIG. 6 illustrates types of V2X transmission resource pools.

FIG. 6 illustrates types of V2X transmission resource pools.

Referring to FIG. 6(a), V2X transmission resource pool #A may be a resource pool that allows (partial) sensing only. In the V2X transmission resource pool #A, a UE needs to select a V2X transmission resource after performing (partial) sensing, and random selection may not be allowed. As shown in FIG. 6(a), a V2X transmission resource selected by (partial) sensing is maintained semi-statically at predetermined intervals.

In order for a UE to perform V2X message transmission on the V2X transmission resource pool #A, a base station may configure a (scheduling assignment decoding/energy measurement-based) sensing operation to be performed (partially). This may be interpreted as not allowing 'random selection' of a transmission resource on the V2X transmission resource pool #A but may be interpreted as (allowing) performing (only) '(partial) sensing' based transmission resource selection. The configuration may be set by the base station.

Referring to FIG. 6(b), the V2X transmission resource pool #B may be a resource pool that allows random selection only. In the V2X transmission resource pool #B, a UE may not perform (partial) sensing but select a V2X transmission resource randomly from a selection window. In one example, different from a resource pool which allows (partial) sensing only, a resource pool which allows only random selection may set (or signaled) so that a selected resource may not be semi-statically reserved.

A base station may set not to perform a (scheduling assignment decoding/energy measurement-based) sensing operation so that a UE may perform a V2X message transmission operation on the V2X transmission resource pool #B. This may be interpreted as performing (/allowing) (only) 'random selection' of a transmission resource on the V2X transmission resource pool #B and/or not allowing '(partial) sensing'-based transmission resource selection.

Meanwhile, although not shown in FIG. 6, there may exist a resource pool which allows both (partial) sensing and random selection. A base station may inform (by the UE implementation) that in such a resource pool, either of the (partial) sensing and the random selection may be used to select a V2X resource.

Figure 7:
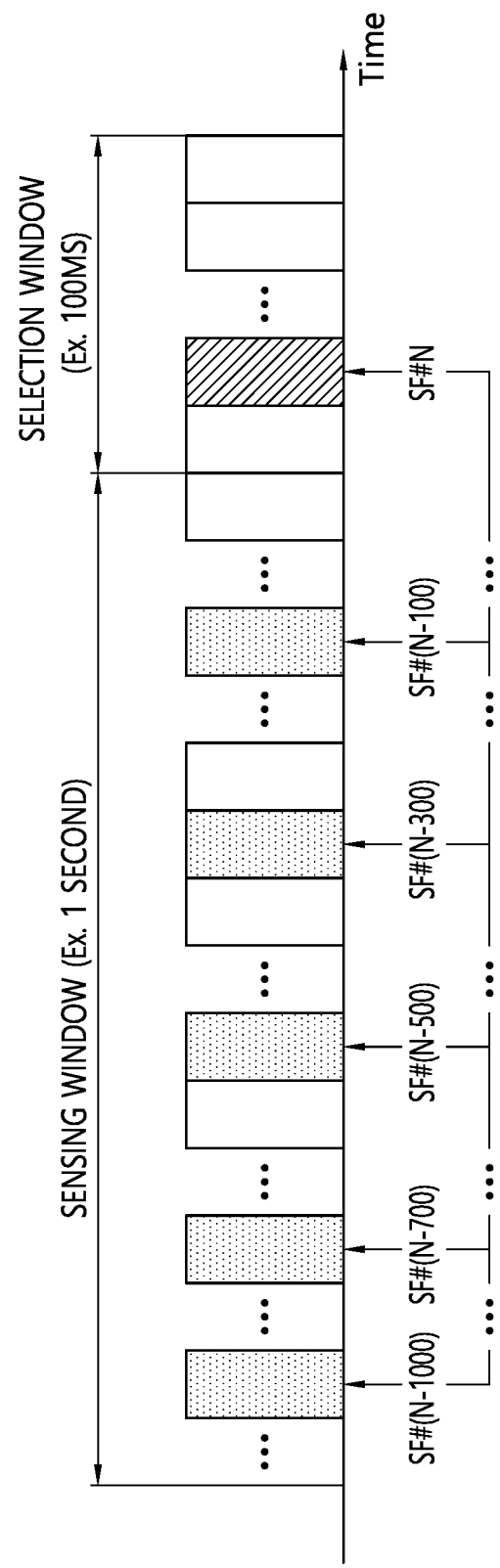
FIG. 7 illustrates a V2X transmission resource (re)selection (/reservation) method according to a partial sensing operation.

FIG. 7 illustrates a V2X transmission resource (re)selection (/reservation) method according to a partial sensing operation.

Referring to FIG. 7, a UE (which denotes a P-UE in what follows) may determine (or trigger) (re)selection (or reservation) of a resource for V2X signal transmission (depending on whether a predetermined condition is satisfied). For example, suppose the transmission resource (re)selection (or reservation) is determined or triggered at subframe #m. In this case, the UE may (re)select (or reserve) a resource for V2X signal transmission from within a subframe period ranging from the subframe #m+T1 to #m+T2. Hereinafter, the subframe period ranging from the subframe #m+T1 to #m+T2 is called a selection window. For example, a selection window may comprise 100 consecutive subframes.

A UE may select at least Y subframes within a selection window as candidate resources. In other words, a UE may have to consider at least Y subframes as candidate resources within the selection window. The Y value may be a predetermined value or may be determined by the network. It should be noted that how to select Y subframes within a selection window may be subject to issues of implementing a UE. In other words, suppose the Y value is 50. Then the UE may select which 50 subframes to select among 100 subframes comprising a selection window. For example, the UE may select 50 subframes whose subframe number is an odd number from among the 100 subframes. Likewise, the UE may select 50 subframes whose subframe number is an even number. Alternatively, 50 subframes may be selected by an arbitrary rule.

Meanwhile, in order to (re)select (or reserve) a specific subframe among the Y subframes, for example, subframe #N (SF #N) as a V2X transmission subframe capable of transmitting a V2X signal, the UE may have to be linked to the subframe #N or sense at least one associated subframe. The (whole) subframe period defined for sensing is called a sensing window, which may comprise 1000 subframes, for example. That is, a sensing window may span 1000 milliseconds or 1 second. For example, the UE may sense subframes corresponding to subframe #N−100*k (where k may be a set of elements in the range [1, 10] and may be preset or determined by the network) within the sensing window.

FIG. 7 illustrates a case in which k values are {1, 3, 5, 7, 10}. In other words, the UE may sense subframe #N−1000, #N−700, #N−500, #N−300, and #N−100, estimate/determine whether the subframe #N is used by other V2X UE (and/or whether relatively high interference (or interference larger than a preset (or signaled) threshold value) exists on the subframe #N), and (finally) select the subframe #N according to the result. Since a P-UE is more sensitive to battery consumption than a V-UE, not all the subframes within the sensing window are sensed but only part thereof is sensed, that is, partial sensing is performed.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Here, a reference point of the S-RSSI may be an antenna connector of the UE.

If receiver diversity is in use by the UE, the reported value may not be lower than the corresponding S-RSSI of any of the individual diversity branches.

The S-RSSI may be applied to RRC_IDLE intra-frequency, RRC_IDLE inter-frequency, RRC_CONNECTED intra-frequency, and RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Here, the reference point for the PSSCH-RSRP may be the antenna connector of the UE.

If receiver diversity is in use by the UE, the reported value may not be lower than the corresponding PSSCH-RSRP of any of the individual diversity branches The PSSCH-RSRP may be applied to RRC_IDLE intra-frequency, RRC_IDLE inter-frequency, RRC_CONNECTED intra-frequency and RRC_CONNECTED inter-frequency.

Here, the power per resource element may be determined from the energy received during the useful part of the symbol, excluding the CP.

<Channel Busy Ratio (CBR)>

Channel busy ratio (CBR) measured in subframe n is defined as follows:

CBR may mean, for PSSCH, the portion of sub-channels in the resource pool whose S-RSSI measured by the UE exceed a pre-configured threshold sensed over subframes [n−100, n−1].

CBR may mean, for PSCCH, in a pool pre-configured such that PSCCH may be transmitted with its corresponding PSSCH in non-adjacent resource blocks, the portion of the resources of the PSCCH pool whose S-RSSI measured by the UE exceed a pre-configured threshold sensed over subframes [n−100, n−1], assuming that the PSCCH pool is composed of resources with a size of two consecutive PRB pairs in the frequency domain.

The CBR may be applied to RRC_IDLE intra-frequency, RRC_IDLE inter-frequency, RRC_CONNECTED intra-frequency and RRC_CONNECTED inter-frequency.

Here, the subframe index may be based on physical subframe index.

<Channel Occupancy Ratio (CR)>

Channel occupancy ratio (CR) evaluated at subframe n is defined as below.

The CR may mean the total number of sub-channels used for its transmissions in subframes [n−a, n−1] and granted in subframes [n, n+b] divided by the total number of configured sub-channels in the transmission pool over [n−a, n+b].

The CR may be applied to RRC_IDLE intra-frequency, RRC_IDLE inter-frequency, RRC_CONNECTED intra-frequency and RRC_CONNECTED inter-frequency.

Here, a may be a positive integer and b may be 0 or a positive integer. a and b may be determined by UE implementation with 'a+b+1=1000', 'a>=500', and 'n+b should not exceed the last transmission opportunity of the grant for the current transmission'.

Here, CR may be evaluated for each (re)transmission.

Here, in evaluating CR, the UE may assume the transmission parameter used at subframe n is reused according to the existing grant(s) in subframes $[n_{+1}, n+b]$ without packet dropping.

Here, the subframe index may be based on physical subframe index.

Here, the CR may be computed per priority level.

Hereinafter, Sidelink Received Signal Strength Indicator (S-RSSI) and PSSCH Reference Signal Receiver Power (PSSCH-RSRP) are described.

Hereinafter, the present document is described.

As an example, (representatively) a V2X communication mode may be classified into (A) a mode in which a base station signals (/controls) scheduling information related to a V2X message transmission (/reception) (on a pre-configured (/signaled) V2X resource pool (from the base station (/network))) (MODE #3) (e.g., a UE located in the communication coverage of the base station (and/or in RRC_CONNECTED state) is a main target) and/or (B) a mode in which a UE (independently) determines (/controls) scheduling information related to a V2X message transmission (/reception) (on a pre-configured (/signaled) V2X resource pool (from the base station (/network))) (MODE #4) (e.g., a UE located inside/outside of the communication coverage of the base station (and/or in RRC_CONNECTED/IDLE state) is a main target).

Previously, it has not been assumed the case that a MODE 3 V2X UE and a MODE 4 V2X UE are coexisted in a V2X resource pool. That is, previously, it is assumed that there is a resource pool for MODE 3, and separately, there is a resource pool for MODE 4. And it is assumed that the MODE 3 V2X UE performs a V2X communication in a resource pool for MODE 3, and the MODE 4 V2X UE performs a V2X communication in a resource pool for MODE 4.

Owing to this, previously, when the MODE 3 V2X UE performs a V2X communication in a resource pool for MODE 3, the MODE 3 V2X UE does not consider the situation in which the MODE 4 V2X UE are influenced by its own communication seriously (and/or (on the contrary) the situation in which the MODE 3 V2X UE itself is influenced by the MODE 4 V2X UE).

In the future V2X communication, it is considered the situation in which UEs operating in different types of V2X communication modes in a V2X resource pool for improving resource utilization efficiency. That is, in the future V2X communication, on a specific resource pool, the situation may occur that the V2X UE of MODE 3 and the V2X UE of MODE 4 are coexisted.

As such, in the case that the MODE 3 UE and the MODE 4 UE are coexisted, when the MODE 3 V2X UE performs a V2X communication without considering the MODE 4 V2X UE as in the previous case (or when the MODE 4 V2X UE performs a V2X communication without considering the MODE 3 V2X UE), the following situation may occur.

First, in the case that the MODE 4 UE knows that a resource reservation field value of a PSCCH transmitted by another UE is set to '0', the MODE 4 UE determines that the another UE does not reuse (or maintain) a current (using) resource for a next message (or TB) transmission (or selects different resource (from the current resource) for a next message (or TB) transmission).

Here, previously, since the situation in which the MODE 3 UE and the MODE 4 UE are coexisted in a specific resource pool is not considered, even in the case that the MODE 3 UE performs a V2X communication based on Sidelink semi persistent scheduling (SL SPS) (based on resource reservation), the MODE 3 UE set the resource reservation field to '0' (not set to SL SPS period).

Even in the case that the MODE 3 UE and the MODE 4 UE are coexisted in a specific resource pool, when the conventional art is applied, a case may occur that the MODE 4 UE receives a PSCCH including a resource reservation field set to '0' from the MODE 3 UE that performs a V2X communication based on SL SPS operation (based on resource reservation) actually.

In this case, since the resource reservation field on the PSCCH transmitted by the MODE 3 UE is set to '0', (even in the case that the MODE 3 UE performs a V2X communication based on SL SPS (based on resource reservation) actually) the MODE 4 UE determines that the MODE 3 UE does not reuse (or maintain) a current (using) resource for a next message (or TB) transmission (or selects different resource (from the current resource) for a next message (or TB) transmission).

As such, although the MODE 3 UE performs a V2X communication based on SL SPS operation (based on resource reservation) actually, in the aspect of the MODE 4 UE, in the case that the MODE 4 UE misjudges that the MODE 3 UE does not reuse (or maintain) a current (using) resource for a next message (or TB) transmission (or selects different resource (from the current resource) for a next message (or TB) transmission), a problem may occur that the MODE 4 UE fails to sense or exclude the resource occupied by the MODE 3 UE (efficiently). That is, although it is preferable that the MODE 4 UE performs a V2X communication based on the remaining resource except the resource occupied by the MODE 3 UE that performs a V2X communication based on SL SPS operation (based on resource reservation), the MODE 4 UE tries to perform a V2X communication on the resource occupied by the MODE 3 UE.

In contrast to the conventional art, for example, in the case that the MODE 4 UE identifies autonomously that the MODE 3 UE performs a V2X communication based on SL SPS operation (based on resource reservation) accurately, the MODE 4 UE may detect the resource periodically occupied by the MODE 3 UE. In this case, the MODE 4 UE itself may select a resource to perform a V2X communication, and accordingly, the probability that a V2X communication of the MODE 4 UE (or MODE 3 UE) is influenced by V2X communication of the MODE 3 UE (or MODE 4 UE) becomes lowered.

Therefore, to solve the problem of the conventional art, the present document is to provide the configuration in which a resource reservation field on a PSCCH transmitted by the MODE 3 UE is set to a SL SPS period when the MODE 3 UE performs SL SPS (based on resource reservation) such that the MODE 4 UE identifies that the MODE 3 UE performs SL SPS operation (based on resource reservation). In addition, the present document provides additional embodiments which may be independently (or being merged) applied from the embodiment in which the MODE 3 UE set the resource reservation field to a SL SPS period as above.

Furthermore, hereinafter, for the convenience of description, 'MODE 3 UE' may be used with 'MODE 3 V2X UE', 'MODE #3 UE', 'MODE 3 UE', and the like in mixed manner. Furthermore, 'MODE 4 UE' may be used with 'MODE 4 V2X UE', 'MODE #4 UE', 'MODE 4 UE', and the like in mixed manner.

As an example, the following proposed schemes provide method for a UE operating in V2X communication mode of different type (/property) coexists efficiently on a pre-configured (/signaled) V2X resource pool.

Here, as an example, the V2X communication mode may be classified into (A) a mode in which a base station signals (/controls) scheduling information related to a V2X message transmission (/reception) (on a pre-configured (/signaled) V2X resource pool (from the base station (/network))) (MODE #3) (e.g., a UE located in the communication coverage of the base station (and/or in RRC_CONNECTED state) is a main target) and/or (B) a mode in which a UE (independently) determines (/controls) scheduling information related to a V2X message transmission (/reception) (on a pre-configured (/signaled) V2X resource pool (from the base station (/network))) (MODE #4) (e.g., a UE located inside/outside of the communication coverage of the base station (and/or in RRC_CONNECTED/IDLE state) is a main target).

Here, as an example, in the present document, the wording "sensing operation" may be interpreted as a PSSCH-RSRP measurement operation based on PSSCH DM-RS SEQUENCE (scheduled by a PSCCH that succeeds decoding) and/or an S-RSSI measurement operation (based on V2X resource pool related subchannel).

Figure 8:
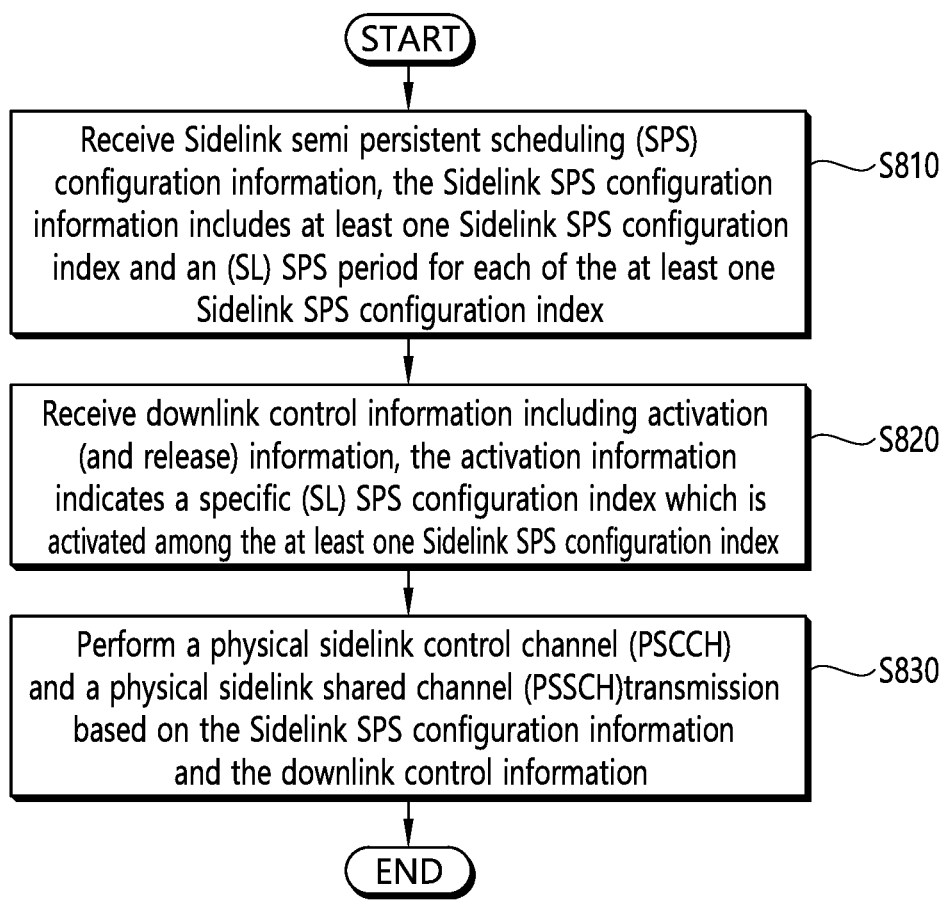
FIG. 8 is a flowchart of a method for performing a V2X communication according to an embodiment of the present document.

FIG. 8 is a flowchart of a method for performing a V2X communication according to an embodiment of the present document.

Referring to FIG. 8, a V2X UE may receive Sidelink semi persistent scheduling (SPS) configuration information (step, S810). In this case, the V2X UE may be a MODE 3 UE.

Here, the Sidelink SPS configuration information may include at least one Sidelink SPS configuration index and an (SL) SPS period for each of the at least one Sidelink SPS configuration index. Furthermore, the Sidelink SPS configuration information may be received from a base station through radio resource control (RRC) signaling. At this time, the Sidelink SPS configuration information may be named as 'SPS-ConfigSL', for example, and the Sidelink SPS configuration index may be named as 'sps-ConfigIndex', for example. In addition, the (SL) SPS period may be named as 'semiPersistSchedIntervalSL', for example.

Here, 'semiPersistSchedIntervalSL' value may be defined as the number of subframes. For example, in the case that 'semiPersistSchedIntervalSL' value is SF 20, this may mean that the (SL) SPS period is 20-subframe unit.

The V2X UE receives downlink control information including activation (and release) information (step, S820). In this case, the downlink control information may be received from the base station, and the downlink control information may mean downlink control information (DCI) format 5A. The activation information may indicate a specific (SL) SPS configuration index which is activated among the at least one Sidelink SPS configuration index.

Here, DCI format 5A is described below in detail.

<DCI Format 5A>

DCI format 5A may be used for scheduling a physical sidelink control channel (PSCCH), and in addition, may include a few sidelink control information (SCI) format 1 fields used for scheduling a physical sidelink shared channel (PSSCH).

Here, the following information may be transmitted through DCI format 5A.

Carrier indicator

Lowest index of sub-channel allocation for an initial transmission

SCI format 1 fields (frequency resource position of initial transmission and retransmission and/or time gap between initial transmission and retransmission)

Sidelink index

Here, in the case that DCI format 5A Cyclic Redundancy Check (CRC) is scrambled with SL-SPS-V-RNTI, the following fields (or information) may be existed.

SL SPS configuration index activation/release indication

In summary, the base station may inform, through "DCI format 5A" transmission, (A) an SL SPS CONFIGURATION INDEX to ACTIVATION (and RELEASE) among the "SL SPS CONFIGURATION INDEX(S)" set by RRC SIGNALING in advance and (B) (PSCCH/PSSCH) frequency resource size/position information, TIMP GAP between INITIAL TRANSMISSION and RETRANSMISSION, and the like, which are to be used when a PSCCH/PSSCH transmission is performed based on the corresponding period in relation to the corresponding ACTIVATED SL SPS CONFIGURATION INDEX (linked).

Later, the V2X UE performs a physical sidelink control channel (PSCCH) transmission based on the Sidelink SPS configuration information and the downlink control information (step, S830). Here, the V2X UE may also perform a PSSCH transmission based on the Sidelink SPS configuration information and the downlink control information.

At this time, when the UE performs the PSCCH and PSSCH transmissions, the UE may set a resource reservation field value on the PSSCH to an (SL) SPS period value for the (activated) specific (SL) SPS configuration index.

Here, the resource reservation field may be included in the sidelink control information (SCI), and detailed description for SCI format 1 is as below.

<SCI Format 1>

SCI format 1 may be used for scheduling PSSCH.

Here, through SCI format 1, the following information (or field) may be transmitted.

priority resource reservation frequency resource location of initial transmission and retransmission Time gap between initial transmission and retransmission Modulation and coding scheme Retransmission index Reserved information bit For the convenience of understanding, the example of FIG. 8 is described again as below.

The MODE 3 SL SPS UE (in RRC CONNECTED state) may receive "SL SPS CONFIGURATION information" from the base station through RRC SIGNALING. Here, the corresponding "SL SPS CONFIGURATION information" may include one or more "SL SPS CONFIGURATION INDEX", and "(SL SPS) period information" and the like are linked with each "SPS CONFIGURATION INDEX".

Later, the base station may inform, through "DCI format 5A" transmission, (A) an SL SPS CONFIGURATION INDEX to ACTIVATION (and RELEASE) among the "SL SPS CONFIGURATION INDEX(S)" set by RRC SIGNALING in advance and (B) (PSCCH/PSSCH) frequency resource size/position information, TIMP GAP between INITIAL TRANSMISSION and RETRANSMISSION, and the like, which are to be used when a PSCCH/PSSCH transmission is performed based on the corresponding period in relation to the corresponding ACTIVATED SL SPS CONFIGURATION INDEX (linked).

At this time, when the MODE 3 SL SPS UE performs PSCCH/PSSCH transmission based on (the) information in relation to the corresponding ACTIVATED SL SPS CONFIGURATION INDEX, the MODE 3 SL SPS UE may set "RESOURCE RESERVATION FIELD" on a PSCCH to "(SL SPS) period" which is linked with ACTIVATED SL SPS CONFIGURATION INDEX.

Furthermore, in FIG. 8, the steps are depicted separately for the convenience of description, but this is just for the convenience of description of the present document. That is, the steps in FIG. 8 may be merged into one step.

So far, the embodiment of the present document is described with reference to drawings. Here, setting the resource reservation field on a PSCCH transmitted by the MODE 3 UE to the SL SPS period is not just applied to the situation in which the MODE 3 UE and the MODE 4 UE are coexisted in a specific resource pool only. In other words, (in addition to the situation in which the MODE 3 UE and the MODE 4 UE are coexisted in a specific resource pool) even in the case that only the MODE 3 UE is existed in a specific resource pool, the resource reservation field on a PSCCH transmitted by the MODE 3 UE may be set to the SL SPS period.

In addition, not only the MODE 4 UE receives the PSCCH to which the resource reservation field is set to the SL SPS period by the MODE 3 UE. In other words, the UE interested in a V2X communication (without regard to whether it is the MODE 3 UE or the MODE 4 UE) may receive the PSCCH to which the resource reservation field is set to the SL SPS period by the MODE 3 UE.

Hereinafter, the examples are further proposed, which are for the method for a UE operating in different type (/property) of V2X communication mode to exist efficiently on a pre-configured (/signaled) V2X resource pool.

[Proposed Method]

As an example, in the case that the UEs operating in MODE #3/4 are coexisted on a pre-configured (/signaled) V2X resource pool, it may be defined (/signaled) to follow (a part of) the following rules. Here, as an example, a (specific) UE may identify that the UEs operating in MODE #3/4 are coexisted on a V2X resource pool through (A) an (related) indicator signaled with (e.g., SIB or RRC) V2X resource pool configuration information (e.g., "V2X MODE

3/4 ON/OFF INDICATOR") and/or (B) a pre-configured (related) field (/indicator) on a PSCCH (e.g., "V2X MODE INDICATOR").

Here, as an example, the (corresponding) "V2X MODE INDICATOR (e.g., 1 bit)" may be defined using "RESERVATION BIT (/FIELD)" on the previous (REL-14) PSCCH. Here, as an example, the following (a part of) schemes may be restrictively applied only to the case that a UE of "MODE #4 SL SPS (and/or SL DYNAMIC SCHEDULING) operation" and a UE of "MODE #3 SL SPS (and/or SL DYNAMIC SCHEDULING) operation" are (allowed) to be coexisted on a pre-configured (/signaled) V2X resource pool in limited manner.

Here, for example, in the present document, the wording "MODE #3" may be (extendedly) applied to (at least) one of "SL SPS (and/or SL DYNAMIC SCHEDULING (and/or UL SPS) operation (based on MODE #3)", and in addition, the wording "MODE #4" may be (extendedly) applied to (at least) one of "SL SPS (and/or SL DYNAMIC SCHEDULING (and/or UL SPS) operation (based on MODE #4)". Here, as an example, hereinafter, for the convenience of description, the UEs operating in MODE #3/4 are named as "MODE 3 UE" and "MODE 4 UE", respectively, and the V2X resource pool in which MODE #3/4 UEs are coexisted is named as "COEX_POOL".

Here, for example, the following (a part of) schemes may be restrictively applied only to the case that the MODE #3 SL SPS UE set "RESOURCE RESERVATION" field on a PSCCH (e.g., SCI FORMAT #1) to a period value in relation to "SL SPS CONFIGURATION INDEX" which is activated by a predefined DCI (e.g., (CRC is scrambled with SL-SPS-V-RNTI) DCI FORMAT #5A).

Here, for example, the MODE #3 UE may apply the following (a part of) schemes only to COEX_POOL, and (on the contrary) may operate in the same way of the conventional (REL-14) method on a V2X resource pool in which only MODE #3 UE is existed (e.g., (REL-14) MODE #3 UE does not perform CBR measurement and/or reporting operation, RADIO-LAYER PARAMETER ADAPTATION operation, sensing operation, etc. on a V2X resource pool).

Here, for example, the (a part of) proposed schemes of the present document may be extendedly applied for MODE #3 UE (and/or MODE #4 UE) on a V2X resource pool in which only MODE #3 UE (and/or MODE #4 UE) is existed.

Here, for example, a (specific) V2X resource pool sharing between MODE #3/4 UEs may be restrictively allowed only to the case that a CBR measurement value (in relation to the (corresponding) V2X resource pool) is a pre-configured (/signaled) threshold value or less (/more) (and/or (on the (corresponding) V2X resource pool) (at least) V2X message transmission (/reception) based on a base station (time/frequency) synchronization is allowed).

Here, for example, in the present document, the wording "CBR" may be interpreted as "MODE-SPECIFIC CBR (e.g., CBR measurement value for MODE #4 UE (and/or MODE #3 UE))" (and/or "UE TYPE (/RELEASE)-SPECIFIC CBR (e.g., CBR measurement value for LEGACY (REL-14) UE (and/or ADVANCED (REL-15) UE)").

Here, for example, the (a part of or the whole) proposed schemes of the present document may be (restrictively or extendedly) applied for MODE #4 UE (/communication) (and/or MODE #3 UE (/communication)).

(Rule #1-1)

As an example, on a pre-configured (/signaled) COEX_POOL, the MODE #3 UE (exceptionally) performs CBR measurement and/or reporting operation (additionally).

Here, for example, in the case that the corresponding rule is applied, ((particularly) on COEX_POOL, when the number of MODE #4 UEs in RRC_CONNECTED state are relatively smaller (and/or when the number of MODE #4 UEs in IDLE state are relatively greater)), it is useful for a base station determines (A) whether it is required to change (the corresponding) COEX_POOL related (existing) configuration information (e.g., resource pool size, etc.) and/or (B) whether to adjust (/control) the number of MODE #3 UEs (and/or (C) whether it is required to change a measured CBR value (/range) (on COEX_POOL), RADIO-LAYER PARAMETER SET allowed (/restricted) according to PPPP value of a V2X message (to transmit) (e.g., maximum transmission power, retransmission number value (/range) per transport block (TB), MCS value (/range), maximum limit (CR_LIMIT) of OCCUPANCY RATIO, etc.), and the like.

Rule #1-1 is described in detail as below.

Rule #1-1 corresponds to a method for a MODE 3 UE to provide information which may be helpful for a base station to the base station such that the base station efficiently operates/manages a resource pool in which different modes of UEs are coexisted.

Figure 9:
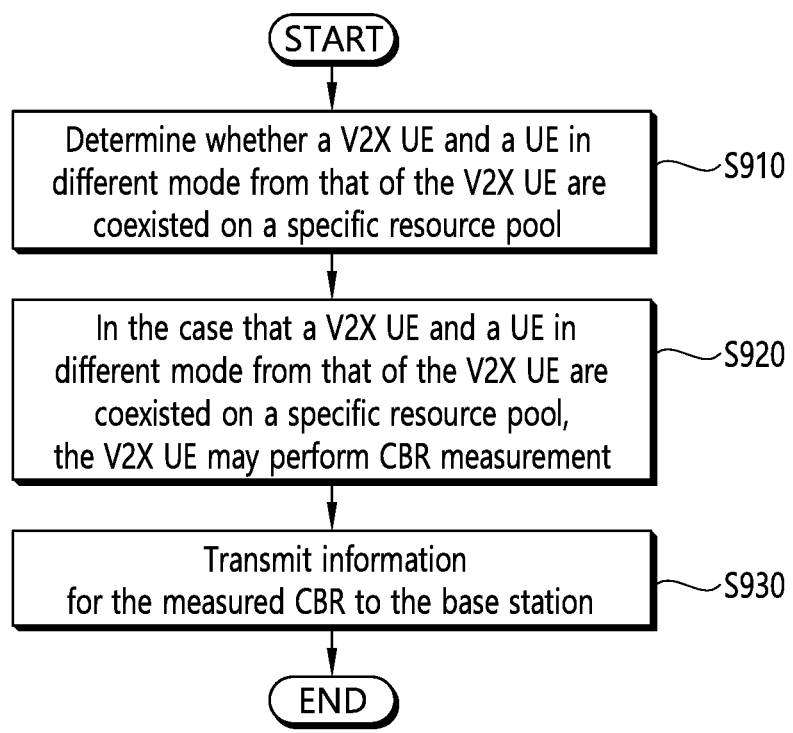
FIG. 9 is a flowchart of a V2X communication method according to rule #1-1 according to an embodiment of the present document.

FIG. 9 is a flowchart of a V2X communication method according to rule #1-1 according to an embodiment of the present document.

Referring to FIG. 9, a V2X UE determines whether a V2X UE and a UE in different mode from that of the V2X UE are coexisted on a specific resource pool (step, S910). In this case, the V2X UE may be a MODE 3 UE and the UE in different mode from that of the V2X UE may be a MODE 4 UE.

In the case that a V2X UE and a UE in different mode from that of the V2X UE are coexisted on a specific resource pool, the V2X UE may perform CBR measurement (step, S920).

Later, the V2X UE may transmit information for the measured CBR to the base station (step, S930). Here, the information for CBR transmitted by the V2X UE may be information which is useful for a base station to determine (A) whether it is required to change (the corresponding) COEX_POOL related (existing) configuration information (e.g., resource pool size, etc.) and/or (B) whether to adjust (/control) the number of MODE #3 UEs (and/or (C) whether it is required to change a measured CBR value (/range) (on COEX_POOL), RADIO-LAYER PARAMETER SET allowed (/restricted) according to PPPP value of a V2X message (to transmit) (e.g., maximum transmission power, retransmission number value (/range) per transport block (TB), MCS value (/range), maximum limit (CR_LIMIT) of OCCUPANCY RATIO, etc.), and the like. Here, detailed example for the information transmitted by the UE is as described above.

Although it is not separately shown, in response to the transmission of the information for CBR, the V2X UE, according to a control of the base station, may change (the existing) configuration information in relation to (the corresponding) COEX_POOL (e.g., a resource pool size, etc.), and/or (allowed) RADIO-LAYER PARAMETER SET (for each combination between CBR value (/range) and PPPP value of a V2X message) (e.g., maximum transmission power, retransmission number value (/range) per TB, MCS value (/range), maximum limit (CR_LIMIT) of OCCUPANCY RATIO, etc.), and the like.

Although it is not depicted separately, for example, the embodiment of FIG. 9 may be combined with the embodiment of FIG. 8. Furthermore, the embodiment of FIG. 9 may be combined with other embodiment for different drawing and/or the embodiments described only in the body of this specification without a separate drawing.

For example, according to an embodiment, the base station may signal SL SPS CONFIGURATION INDEX and PSCCH/PSSCH resource information to be ACTIVATED through DCI FORMAT 5A to a MODE 3 UE. At this time, the base station may inform the SPS period information for each SL SPS CONFIGURATION INDEX to the UE through RRC signaling. Later, when the MODE 3 UE performs SL SPS TX operation through ACTIVATED SL SPS CONFIGURATION INDEX related resource, the base station may set "RESOURCE RESERVATION FIELD" value on SCI FORMAT 1 to the corresponding ACTIVATED SL SPS CONFIGURATION INDEX related period value. At this time, in the case that a MODE 3 UE and a MODE 4 UE are coexisted on the specific resource pool, the MODE 3 UE may perform CBR measurement and transmit the measured CBR result to the base station.

(Rule #1-2)

As an example, (in the case that (Rule #1-2) described above is applied) the MODE #3 UE may perform "RADIO-LAYER PARAMETER ADAPTATION" operation based on "the measured CBR value (/range) (on COEX_POOL)" and/or "PPPP value of the V2X message (to be transmitted)".

Here, for example, RADIO-LAYER PARAMETER SET information which is allowed (/restricted) for each "the measured CBR value (/range) (on COEX_POOL)" and/or "PPPP value of the V2X message (to be transmitted)" may be pre-configured (/signaled) (independently from MODE #4 related information).

Here, for example, (assuming that a MODE #4 UE may avoid a (V2X message) transport resource of a MODE #3 UE (which does not perform a sensing operation) based on a sensing operation) (allowed) PPPP value (/range) in relation to MODE #3 transmission, and/or CR_LIMIT (under the same CBR measurement value (/range) and/or PPPP value of a V2X message (to be transmitted)) and/or a maximum transmission power value (and/or retransmission number value (/range) per TB, MCS value (/range), etc. may be set relatively higher than that of MODE #4 transmission (or lower (e.g., for the purpose of giving penalty to the MODE #3 UE that does not perform the sensing operation).

Here, for example, CBR threshold value used for (sub) channel BUSY (/IDLE) determination for the MODE #3 UE may be pre-configured (/signaled) (independently from MODE #4 related information).

Here, for example, (the corresponding) CBR threshold value in relation to the MODE #3 UE may be configured (/signaled) relatively lower (or higher) in comparison with that of the MODE #4 UE. Here, for example, a (specific) UE may perform CR (and/or CBR) measurement independently (or in merged manner) between different modes.

In addition, for example, (according to (rule #1-1) described above) in the case that the MODE #3 UE does not perform CBR measurement and/or reporting operation (additionally) on COEX_POOL, based on "NOMINAL (or specific) CBR value (/range)" pre-configured (/signaled) (and/or "PPPP value of a V2X message (to be transmitted)"), the MODE #3 UE may perform "RADIO-LAYER PARAMETER ADAPTATION" operation.

(Rule #2-1)

As an example, on pre-configured (/signaled) COEX_POOL, the MODE #3 UE may perform sensing (/measurement) operation (exceptionally).

Here, for example, (the corresponding) "sensing (/measurement) operation" wording may be (extendedly) interpreted to (at least) one between "FULL SENSING" (and/or "PARTIAL SENSING").

Here, for example, in the case that the corresponding rule is applied, through a predefined channel (/signal), (the MODE #3 UE may) inform (A) whether a currently scheduled (MODE #3 transmission) resource is suitable (and/or whether it is required to change (/(non)-activate) and/or (B) resource information of which interference (and/or collision probability) (from MODE #4 UE) is relatively small (preferred by the MODE #3 UE itself) (or great (not preferred by the MODE #3 UE itself), and the like (a sort of "ASSISTANCE INFORMATION" form).

Here, for example, (the corresponding) information (ASSISTANCE INFORMATION) (reported by the MODE #3 UE) may be defined in the form of sub-channel information (e.g., position (/pattern)/period/subframe offset, etc.) (in relation to the corresponding sub-channel)) of which interference (and/or collision probability) (from MODE #4 UE) is relatively small (preferred by the MODE #3 UE itself) (or great (not preferred by the MODE #3 UE itself) (in addition to the conventional (REL-14) information (e.g., maximum TB size, estimated data (/packet) arrival period, estimated packet arrival timing (subframe offset), PPPP value inter-linked reported traffic pattern, etc.).

Here, for example, when the UE reports "ASSISTANCE INFORMATION" (to the base station), the UE may inform a (its own sensed (/measured)) mode sort (/type) information (together).

Here, for example, the wording "resource" may be extendedly interpreted to "(MODE #3) SPS CONFIGURATION (INDEX)".

In summary, rule #2-1 corresponds to a method for the MODE 3 UE to provide information which may be helpful for the base station, after the MODE 3 UE performs a sensing, by transmitting the result of performing sensing. Hereinafter, the contents for rule #2-1 is described with reference to the drawing.

Figure 10:
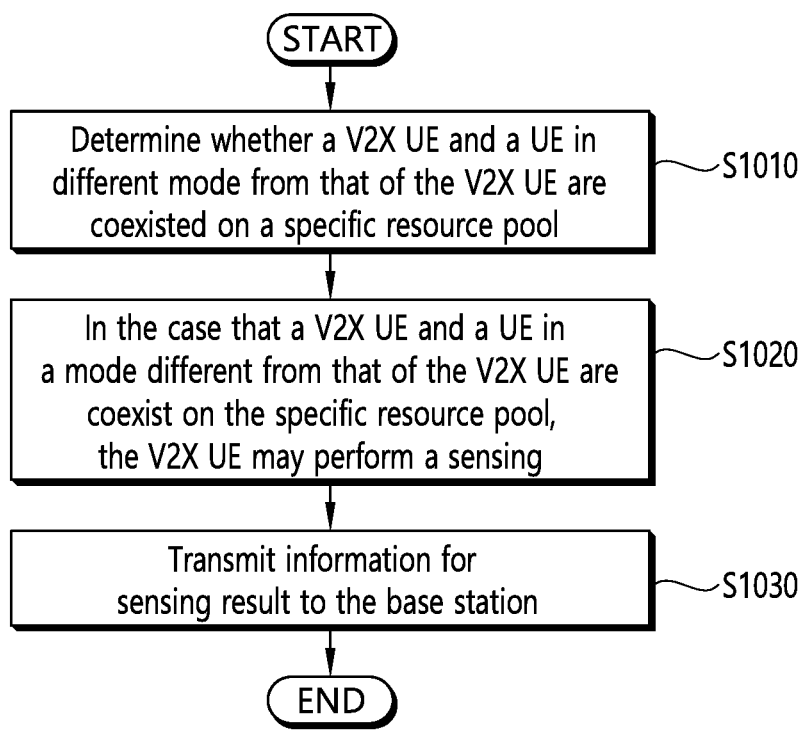
FIG. 10 is a flowchart of a V2X communication method according to rule #2-1 according to an embodiment of the present document.

FIG. 10 is a flowchart of a V2X communication method according to rule #2-1 according to an embodiment of the present document.

Referring to FIG. 10, a V2X UE determines whether a V2X UE and a UE in different mode from that of the V2X UE are coexisted on a specific resource pool (step, S1010). In this case, the V2X UE may be a MODE 3 UE and the UE in different mode from that of the V2X UE may be a MODE 4 UE.

In the case that a V2X UE and a UE in a mode different from that of the V2X UE are coexist on the specific resource pool, the V2X UE may perform a sensing (step, S1020). Here, the detailed description for the sensing is as described above.

Later, the V2X UE may transmit information for sensing result to the base station (step, S1030). Here, for example, the information for sensing result transmitted by the V2X UE may be in the form of (A) whether a currently scheduled (MODE #3 transmission) resource is suitable (and/or whether it is required to change (/(non)-activate) and/or (B) resource information of which interference (and/or collision probability) (from MODE #4 UE) is relatively small (preferred by the MODE #3 UE itself) (or great (not preferred by the MODE #3 UE itself), and the like. Here, the detailed example of the information transmitted by the UE is as described above.

Although it is not separately shown, the V2X UE may be indicated by a resource reconfiguration in response to the information transmitted to the base station, and in this case, the base station may transmit a new resource for resource reconfiguration to the V2X UE. That is, in the case that the MODE 3 UE and the MODE 4 UE are coexisted on a resource pool, the MODE 3 UE may sense whether the (SL) SPS resource configured by the base station is a resource that undergoes much interference (from MODE #4 UE) (through a predefined rule). Later, when the UE reports that interference of the resource configured by the base station is severe, the base station may reconfigure (SL) SPS resource to the UE.

Although it is not depicted separately, for example, the embodiment of FIG. 10 may be combined with the embodiment of FIG. 8. Furthermore, the embodiment of FIG. 10 may be combined with other embodiment for different drawing and/or the embodiments described only in the body of this specification without a separate drawing.

For example, according to an embodiment, the base station may signal SL SPS CONFIGURATION INDEX and PSCCH/PSSCH resource information to be ACTIVATED through DCI FORMAT 5A to a MODE 3 UE. At this time, the base station may inform the SPS period information for each SL SPS CONFIGURATION INDEX to the UE through RRC signaling. Later, when the MODE 3 UE performs SL SPS TX operation through ACTIVATED SL SPS CONFIGURATION INDEX related resource, the base station may set "RESOURCE RESERVATION FIELD" value on SCI FORMAT 1 to the corresponding ACTIVATED SL SPS CONFIGURATION INDEX related period value. At this time, in the case that a MODE 3 UE and a MODE 4 UE are coexisted on the specific resource pool, the MODE 3 UE may perform a sensing and transmit the sensing result to the base station.

Here, for example, (by the MODE #3 UE) (the) sensing (/measurement) operation may be performed by the following (a part of) rules, and/or (sensing (/measurement)) result information (in the predefined form) may be reported.

Example #2-1-1

As an example, the MODE #3 UE may perform sensing (/measurement) operation for (a part of) resource in relation to (ACTIVATED) SPS CONFIGURATION (INDEX) (DTX_SPSCFG) which is not (currently) used for a V2X message transmission, among a plurality of (ACTIVATED) SPS CONFIGURATIONS (INDEXES).

Here, for example, the sensing (/measurement) operation information for (a part of) resource in relation to (the corresponding) DTX_SPSCFG (e.g., sensing (/measurement) pattern (/period), etc.) may be pre-configured (/signaled).

Here, for example, the sensing (/measurement) operation for (a part of) resource in relation to (ACTIVATED) SPS CONFIGURATION (INDEX) (TX_SPSCFG) which is (currently) used for a V2X message transmission may be performed based on "SILENCING DURATION" which is pre-configured (/signaled) (from the base station).

Here, for example, it may be interpreted that the MODE #3 UE perform a sensing (/reception) operation (for (a part of) resource in relation to TX_SPSCFG, not performing the V2X message transmission operation (in relation to TX_SP-SCFG) on the (corresponding) "SILENCING DURATION" (and/or omitting the V2X message transmission operation).

Here, for example, the configuration information in relation to the (corresponding) "SILENCING DURATION" may include (sensing (/measurement)) pattern (e.g., bitmap) and/or period (and/or interlinked (ACTIVATED) SPS CONFIGURATION (INDEX)), and the like.

Here, for example, in order to reduce influence (and/or performance degradation) due to V2X message interruption (/omission) (in relation to TX_SPSCFG) on "SILENCING DURATION", the UE may (A) (re)perform (interrupted (/omitted) V2X message transmission operation (in relation to TX_SPSCFG) using (a part of) resource in relation to (ACTIVATED) SPS CONFIGURATION (INDEX), not "SILENCING DURATION", and/or (B) (re)perform (interrupted (/omitted) V2X message transmission operation (in relation to TX_SPSCFG) in the form of "ONE-SHOT TRANSMISSION" (e.g., interpreted as a transmission form performed without a resource reservation and/or a SINGLE PACKET(/MAC PDU) transmission form) (using other resource than (current) "SILENCING DURATION").

Here, for example, the UE that performs the corresponding operation may signal the related information (e.g., transmission operation interruption information based on the conventional SPS CONFIGURATION (INDEX) resource, SPS CONFIGURATION (INDEX) switching information, etc.) (to another UE) through a predefined channel (e.g., PSCCH (WITHOUT HAVING ASSOCIATED PSSCH TRANSMISSION)).

Example #2-1-2

As an example, the base station (or a network) may instruct a resource measurement (/sensing) in a specific (resource) position (e.g., period/subframe offset) to the MODE #3 UE through a predefined signaling.

Here, for example, (together with the ASSISTANCE INFORMATION described above) (the corresponding) UE may report (A) measurement (/sensing) value for each SPS CONFIGURATION (INDEX) and/or (B) a highest (and/or higher "K") SPS CONFIGURATION (INDEX) (in the aspect of interference amount and/or collision probability (measured) (from the MODE #4 UE)).

Here, for example, the rule may be interpreted that (the base station (or network)) (A) instructs to measure (/sense) for inactivated (SPS CONFIGURATION (INDEX) related) (a part of) resource among (pre-configured (/signaled)) SPS CONFIGURATIONS (INDEXES), and/or (B) instructs to measure (/sense) the corresponding (a part of) resource before activating SPS CONFIGURATION (INDEX) (pre-configured (/signaled)), and/or (C) "MEASUREMENT(/SENSING) CONFIGURATION" is configured (/signaled) separately from SPS CONFIGURATION, and instructs to report measure (/sense) result based on the corresponding "MEASUREMENT(/SENSING) CONFIGURATION".

(Rule #3-1)

As an example, ((particularly) when MODE #3/4 UEs are distinguished through applying a predefined method,) sensing (/measurement) operation may be performed according to (a part of) the rule below.

Here, for example, distinguishing the MODE #3/4 UEs may be (A) performed through a predefined (related) field (/indicator) on a PSCCH (e.g., "V2X MODE INDICATOR" (e.g., using (the conventional (REL-14)) "RESERVATION BIT(/FIELD)"), and/or (B) performed by configuring (/signaling) a PPPP value (/range) (differently) which may be used (/allowed) for each MODE.

Example #3-1-1

As an example, (on COEX_POOL) (a part of) parameter below in relation to sensing operation (and/or V2X message transmission) of the MODE #4 UE (or MODE #3 UE) may be differently configured (/signaled) in comparison with that of the MODE #3 UE (or MODE #4 UE) (and/or in comparison with a V2X resource pool in which only the same mode UEs are existed).

In addition, for example, the UE may apply a pre-configured (/signaled) different (a part of) parameter below (in relation to sensing operation) according to whether the detected (/sensed) (based on PSCCH decoding) mode of different UE is identical or different from the UE itself.

Hereinafter, it is described a method for a MODE 4 UE (or a MODE 3 UE) to perform a V2X communication based on information for a resource which is occupied by a MODE 3 UE (or a MODE 4 UE) with reference to drawings.

Figure 11:
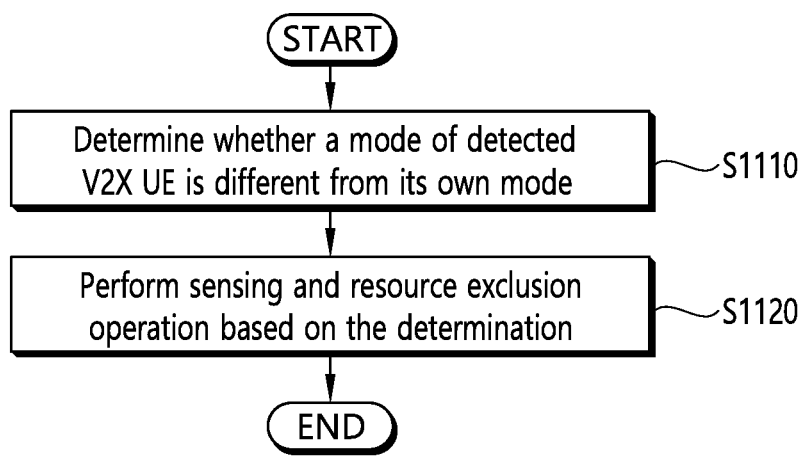
FIG. 11 is a flowchart of a V2X communication method according to example #3-1-1 according to an embodiment of the present document.

FIG. 11 is a flowchart of a V2X communication method according to example #3-1-1 according to an embodiment of the present document.

Referring to FIG. 11, a V2X UE determines whether a mode of detected V2X UE is different from its own mode (step S1110). Here, the V2X UE may correspond to MODE 4 UE and the detected V2X UE may mean MODE 3 UE.

Later, the V2X UE performs sensing and resource exclusion operation based on the determination (step, S1120). For example, as described above, (on COEX_POOL) (a part of) parameter below in relation to sensing operation (and/or V2X message transmission) of the MODE #4 UE (or MODE #3 UE) may be differently configured (/signaled) in comparison with that of the MODE #3 UE (or MODE #4 UE) (and/or in comparison with a V2X resource pool in which only the same mode UEs are existed). A repeated description for the overlapped contents is omitted.

In addition, as described above, for example, the UE may apply a pre-configured (/signaled) different (a part of) parameter below (in relation to sensing operation) according to whether the detected (/sensed) (based on PSCCH decoding) mode of different UE is identical or different from the UE itself. Here, for example, when the MODE #4 UE detects (/senses) (different) MODE #3 UE, (a part of) parameter below of relatively lower (or higher) value (/range) may be applied in comparison with the case of detecting (/sensing) (different) MODE #4 UE.

Although it is not depicted separately, for example, the embodiment of FIG. 11 may be combined with the embodiment of FIG. 8. Furthermore, the embodiment of FIG. 11 may be combined with other embodiment for different drawing and/or the embodiments described only in the body of this specification without a separate drawing.

Here, for example, when the MODE #4 UE detects (/senses) (different) MODE #3 UE, (a part of) parameter below of relatively lower (or higher) value (/range) may be applied in comparison with the case of detecting (/sensing) (different) MODE #4 UE.

(V2X message related) PPPP value (/range) is selected (e.g., MODE #4 UE select relatively lower (or higher) PPPP value (/range) than the MODE #3 UE), a transmission of MODE #3 UE (or MODE #4 UE) may be more protected relatively.

Here, for example, a transmission based on low (or high) PPPP value (/range) means that it is determined relatively high (or low) PSSCH-RSRP threshold value when another UE determines whether the resource used by the corresponding transmission may be selected (or IDLE/BUSY) (and/or relatively low (or high) PSSCH-RSRP threshold value inter-linked with the PPPP value (/range) is configured (/signaled) to the MODE #4 UE in comparison with the MODE #3 UE although it is the same PPPP value (/range), a transmission of MODE #3 UE (or MODE #4 UE) may be more protected relatively.) (and/or sensing operation performing duration (/period) and/or duration for selecting candidate (transmission) resource (SELECTION WINDOW) and/or range of selecting (or picking) a random value for determining a maintaining duration of (re)selected (/reserved) resource (and/or a coefficient multiplied to the corresponding selected random value (for deriving C_RESEL value [2]) and/or resource reservation period and/or candidate (transmission) resource rate (/number) that should be remaining in the least after candidate (transmission) resource exclusion operation based on PSSCH-RSRP threshold value (and/or in the case that the corresponding remaining candidate (transmission) resource rate (/number) is smaller than a pre-configured (/signaled) threshold value, offset value added to the (re-lated) PSSCH-RSRP threshold value) and/or candidate (transmission) resource rate (/number) that should be remaining in the least after candidate (transmission) resource exclusion operation based on S-RSSI.

Example #3-1-2

As an example, in the case that (in SENSING WINDOW) a PSCCH of the MODE #3 UE (or MODE #4 UE) is detected, when the MODE #4 UE (or MODE #3 UE) performs candidate (transmission) resource exclusion operation (in SENSING WINDOW) based on PSSCH-RSRP measurement, the MODE #4 UE (or MODE #3 UE) may not consider (/exclude) resource separated from as much as one "RESOURCE RESERVATION INTERVAL", but consider (/exclude) (all) resources which are repeated as much as pre-configured (/signaled) count (e.g., a positive integer value greater than "1") (and/or infinite count).

In addition, for example, when MODE #4 UE (or MODE #3 UE) performs transmission resource (re)reservation (/selection), in the case that a mode of another UE detected (/sensed) (based on PSCCH decoding) is MODE #3 (or MODE #4), the (transmission) resource used by the corresponding MODE #3 UE (or MODE #4 UE) may be (always) excluded (without regard to whether it exceeds a pre-configured (/signaled) PSSCH-RSRP threshold value.

In addition, for example, (the base station, through a predefined signaling (/indicator)) let the MODE #4 UE (establishing RRC CONNECTION) sense (/measure) a transmission resource of the MODE #3 UE and report (related information (e.g., time/frequency resource position, PPPP value, resource reservation period, UE identifier, etc.)).

Here, for example, the corresponding reporting operation may be performed only for the MODE 3# UE having PSSCH-RSRP (or S-RSSI) measurement value of a pre-configured (/signaled) threshold value or more (or PSCCH (/PSSCH) decoding is succeeded) (e.g., when a selection (/reservation) resource collides, only the UEs of adjacent positions that cause significant interference is considered, and there is an effect of reducing reporting operation overhead).

For example, in the case that the UE senses all resources, excessively much overhead may be exerted to the base station. Accordingly, in the case that the UE senses only for a specific resource, it may be beneficial for the base station overhead reduction.

(Rule #4-1)

As an example, when a specific SPS CONFIGURATION (INDEX) is inactivated (by the base station), through a predefined channel (e.g., PSCCH (WITHOUT HAVING ASSOCIATED PSSCH TRANSMISSION)), the MODE #3 (SL SPS) UE may signal information related information (to another UE (e.g., MODE #4 UE)) (e.g., information informing that a transmission is the last (or end) based on (the corresponding) SPS CONFIGURATION (INDEX) and/or information informing that a resource (reservation) in relation to (the corresponding) SPS CONFIGURATION (INDEX) is RELEASE, etc.).

(Rule #5-1)

As an example, the base station may inform (to (MODE #4) UEs) resource information used in MODE #3 (or having high probability of being used) (e.g., frequency/time resource position, resource reservation period (and/or subframe offset), reserved resource use time, etc.) through a predefined signaling (e.g., "SIB").

Here, for example, the corresponding information may be (A) in the form of informing whether to use MODE #3 (directly) in a pre-configured (/signaled) (all) sub-channel (group) unit, and/or (B) in the form of (indirectly) informing that a part of (frequency/time) resource region (among the entire (frequency/time) resource regions) is used as MODE #3 in high probability (and/or in the form of time resource may be used (/scheduled) as MODE #3).

Here, for example, the MODE #4 UE that receives the corresponding information may perform (MODE #4) resource selection (/reservation) in the remaining (region) except the resource (region) to be used as MODE #3 (with high probability).

Here, for example, the rule may be interpreted in the form of reserving (/signaling) a (specific) resource to be used as MODE #3 in (pre-configured (/signaled)) V2X resource pool (e.g., COEX_POOL).

Here, for example, the resource information (e.g., SPS resource configuration information) used as MODE #3 may be exchanged (/shared) between base stations (/cells) (through predefined signaling (e.g., backhaul signaling)).

Here, for example, when the corresponding rule is applied, between different base stations (/cells), continuing (MODE #3) resource collision may be alleviated.

Here, for example, the base station may inform information for a message related service sort (/type) transmitted through the corresponding MODE #3 resource, (HIGHEST) PRIORITY(/PPPP) (e.g., the base station may identify it through PRIORITY(/PPPP) information interlinked with TRAFFIC PATTERN reported from the MODE #3 UE) additionally (to (MODE #4) UEs)) as well as the resource information used as MODE #3 (or (with high probability).

In summary, rule #5-1 corresponds to a method for a MODE 4 UE to perform a V2X communication by considering a resource used as MODE 3 with the help of a base station. Hereinafter, an example of a V2X communication according to rule #5-1 is described with reference to drawings.

Figure 12:
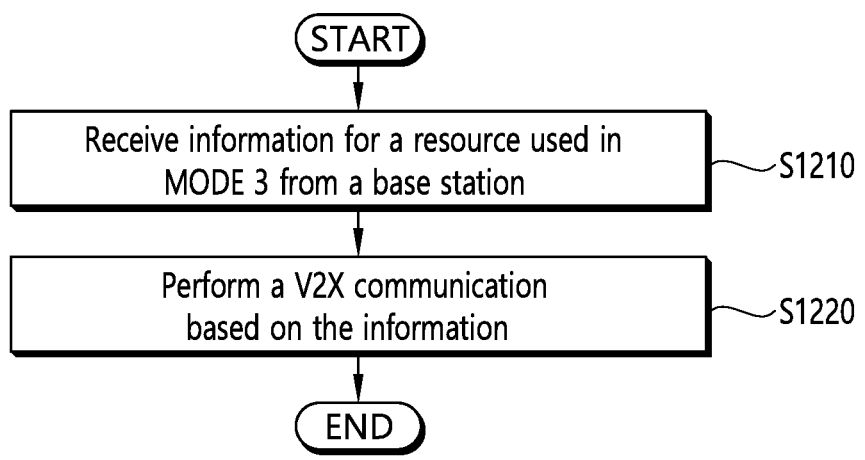
FIG. 12 is a flowchart of a V2X communication method according to rule #5-1 according to an embodiment of the present document.

FIG. 12 is a flowchart of a V2X communication method according to rule #5-1 according to an embodiment of the present document.

Referring to FIG. 12, a V2X UE receives information for a resource used in MODE 3 from a base station (step, S1210). Here, the V2X UE may correspond to the MODE 4 UE.

Later, the UE performs a V2X communication based on the information (step, S1220). Here, for example, the corresponding information may be (A) in the form of (directly) informing whether the MODE #3 is used in (all) sub-channel (group) unit which is pre-configured (/signaled), and/or (B) in the form of (indirectly) informing that (among the entire (frequency/time) resource regions) a part of (frequency/time) resource is used (/scheduled) in MODE #3 with high probability (and/or a specific frequency resource (e.g., sub-channel) (and/or time resource) may be used (/scheduled) in MODE #3). Here, for example, the MODE #4 UE that receives the corresponding information may perform (MODE #4) resource selection (/reservation) in the remaining (region) except the resource (region) used as MODE #3 (with high probability). The detailed example for it is as described above, and repeated description is omitted.

Although it is not depicted separately, for example, the embodiment of FIG. 12 may be combined with the embodiment of FIG. 8. Furthermore, the embodiment of FIG. 12 may be combined with other embodiment for different drawing and/or the embodiments described only in the body of this specification without a separate drawing.

(Rule #5-2)

As an example, through a predefined (physical layer/higher layer) signaling (e.g., SIB, RRC, DCI, etc.), a network (or base station) may inform whether (REL-15) MODE #3 SL SPS UE set "RESOURCE RESERVATION (INTERVAL)" field on a PSCCH (e.g., SCI FORMAT #1) to a period value in relation to an interlinked "SL SPS CONFIGURATION INDEX".

Here, as a particular example, in the case that the (REL-15) MODE #3 SL SPS UE establishes (RRC) CONNECTION with a REL-14 base station (e.g., in the case that the RELEASE FLAG of SIB information transmitted by the base station is shown as 'REL-14'), 'RESOURCE RESERVATION (INTERVAL)' field on a PSCCH may be (implicitly) set to '0' as previously (REL-14), and in addition, on the contrary, in the case that the (REL-15) MODE #3 SL SPS UE establishes (RRC) CONNECTION with a REL-15 base station (e.g., in the case that the RELEASE FLAG of SIB information transmitted by the base station is shown as 'REL-15'), the corresponding base station may inform whether to apply the rule through (A) (additional) RRC (/SIB) signaling, or (B) (MODE #3 PSCCH/PSSCH scheduling (or informed through a field (defined in the corresponding use) on DCI (in relation to MODE #3 (SL) SPS ACTIVATION/RELEASE) (e.g., 1 bit). Here, for example, when the corresponding rule is applied, on the resource pool in which only LEGACY (REL-14) UE is existed (and/or a resource pool set by the base station having function of LEGACY (REL-14) V2X operation), an influence of sensing/resource selection operation of the LEGACY (MODE #4) UE exerted by (REL-15) MODE #3 UE may be decreased (or (REL-15) MODE #3 UE may operate like the LEGACY (REL-14) UE).

Here, for another example, through (additional) indicator which is signaled with V2X resource pool configuration information (e.g., SIB, RRC), the (REL-15) MODE #3 SL SPS UE knows that there are different modes (i.e., MODE #3/4) of UEs are coexisted on a specific resource pool, the (REL-15) MODE #3 SL SPS UE may set the "RESOURCE RESERVATION (INTERVAL)" field on a PSCCH to the interlinked "SL SPS CONFIGURATION INDEX" related period value.

In summary, rule #5-2 corresponds to a method, after receiving separately information for whether to set the (field) information related to resource reservation (on a PSCCH) to (SL) SPS period, of performing a V2X communication based on the received information. Hereinafter, the V2X communication method according to rule #5-2 is described with reference to drawings.

Figure 13:
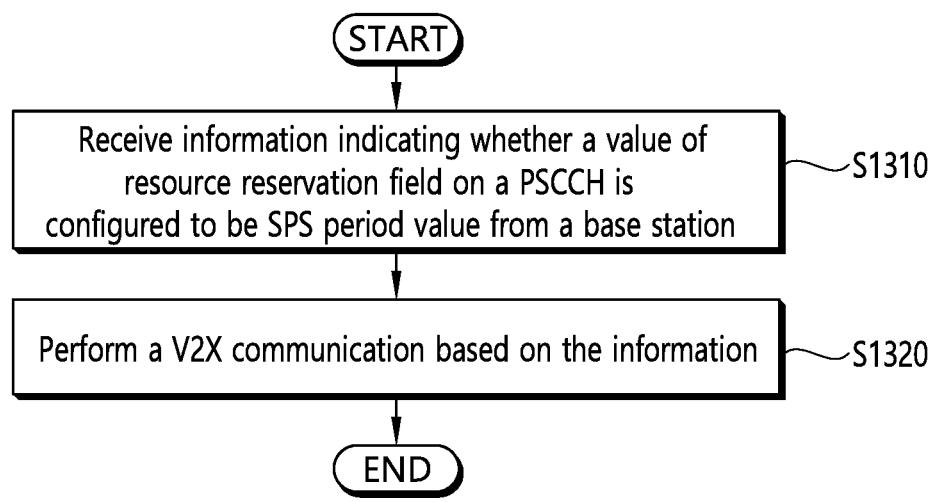
FIG. 13 is a flowchart of a V2X communication method according to rule #5-2 according to an embodiment of the present document.

FIG. 13 is a flowchart of a V2X communication method according to rule #5-2 according to an embodiment of the present document.

Referring to FIG. 13, a V2X UE receives information indicating whether (field) information related to resource reservation (on a PSCCH) is determined to be (SL SPS) period value from a base station (step, S1310). Here, the V2X UE may correspond to a MODE 3 UE. For example, through a predefined (physical layer/higher layer) signaling (e.g., SIB, RRC, DCI, etc.), a network (or base station) may inform whether (REL-15) MODE #3 SL SPS UE set "RESOURCE RESERVATION (INTERVAL)" field on a PSCCH (e.g., SCI FORMAT #1) to a period value in relation to an interlinked "SL SPS CONFIGURATION INDEX". The detailed example for it is as described above, and repeated description is omitted.

Later, the UE performs a V2X communication based on the information (step, S1320).

Although it is not depicted separately, for example, the embodiment of FIG. 13 may be combined with the embodiment of FIG. 8. Furthermore, the embodiment of FIG. 13 may be combined with other embodiment for different drawing and/or the embodiments described only in the body of this specification without a separate drawing.

Since the examples for the proposed method described above may also be included as one of the implementation methods of the present document, it is an apparent fact that the examples may be regarded as a sort of proposed methods.

In addition, the proposed methods described above may be independently implemented, but a part of the proposed methods may be implemented in a form of combination (or being merged).

As an example, the proposed method has been described based on 3GPP LTE system for the convenience of description in the present document, but the range of system to which the proposed method is applied may be extended to other system except the 3GPP LTE system.

For example, the proposed methods of the present document may be extended for a D2D communication.

Here, for example, the D2D communication means that a UE communicates with another UE using direct wireless channel, and here, for example, the UE may mean a UE of a user, but a network equipment such as a base station may be regarded as a sort of UE in the case that the network equipment transmits/receives a signal according to a communication scheme with the UE.

In addition, as an example, the proposed methods of the present document may be limitedly applied to MODE 2 V2X operation (and/or MODE 4 V2X operation) only.

In addition, as an example, the proposed schemes of the present document may be limitedly applied only when transmitting a V2X message based on a specific TXD scheme (e.g., STBC or PRECODING(/BEAM) CYCLING).

Furthermore, as an example, the proposed methods of the present document may be limitedly applied to pre-configured (/signaled) (specific) V2X channel (/signal) transmission (e.g., PSSCH (and/or (interlinked PSCCH and/or PSBCH))).

In addition, as an example, the proposed methods of the present document may be limitedly applied to the case that a PSCCH (interlinked) with a PSSCH is transmitted with being ADJACENT (and/or NON-ADJACENT) (on a frequency domain) (and/or a transmission based on pre-configured (/signaled) MCS (and/or coding rate and/or RB) (value (/range)) is performed)).

Figure 14:
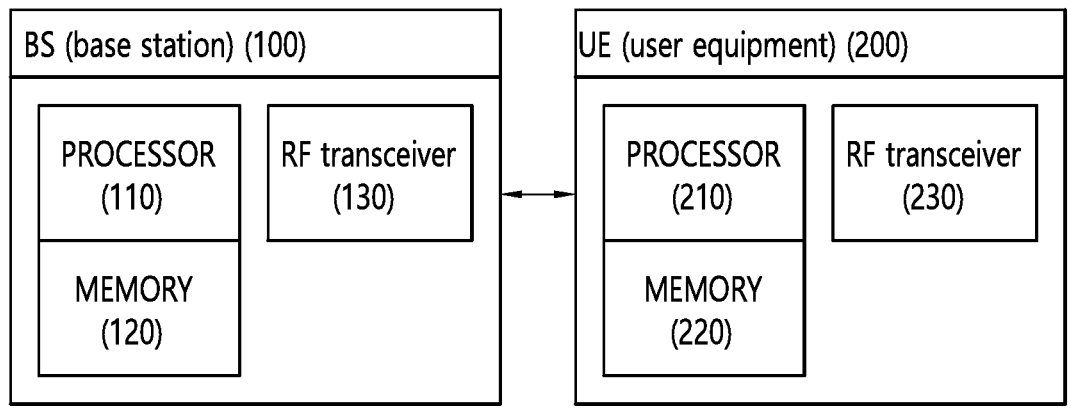
FIG. 14 is a block diagram illustrating a communication device in which the embodiment of the present document is implemented.

FIG. 14 is a block diagram illustrating a communication device in which the embodiment of the present document is implemented.

Referring to FIG. 14, a base station 100 includes a processor 110, a memory 120 and a transceiver 130. The depicted processor, memory and transceiver may be implemented in separate chips, respectively, or at least two blocks/functions may be implemented in a single chip.

The processor 110 implements proposed functions, processes and/or methods. The memory 120 is connected to the processor 110 and stores various types of information for driving the processor 110. The transceiver 130 is connected to the processor 110 and transmits and/or receives radio signals.

A UE 200 includes a processor 210, a memory 220 and a transceiver 230. The processor 210 implements proposed functions, processes and/or methods. The memory 220 is connected to the processor 210 and stores various types of information for driving the processor 210. The transceiver 230 is connected to the processor 210 and transmits and/or receives radio signals. The UE 200 may transmit/retransmit V2X signal to another UE according to the method described above.

The processor 110 or 210 may include Application-Specific Integrated Circuits (ASICs), other chipsets, logic circuits, and/or data processors. The memory 120 or 220 may include Read-Only Memory (ROM), Random Access Memory (RAM), flash memory, memory cards, storage media and/or other storage devices. The transceiver 130 or 230 may include one or more antenna for transmitting and/or receiving radio signals. When the above-described embodiment is implemented in software, the above-described method may be implemented using a module (process or function) which performs the above function. The module may be stored in the memory 120 or 220 and executed by the processor 110 or 210. The memory 120 or 220 may be disposed to the processor 110 or 210 internally or externally and connected to the processor 110 or 210 using a variety of well-known means.

Figure 15:
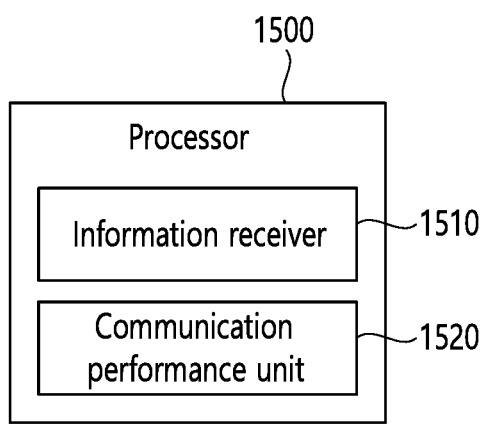
FIG. 15 is a block diagram illustrating an example of a device included in a processor.

FIG. 15 is a block diagram illustrating an example of a device included in a processor.

Referring to FIG. 15, a processor 1500 may include an information receiver 1510 and an information determination unit 1520, as a communication performance unit 1530 as a functional aspect.

Here, the information receiver 1510 may have the function of receiving Sidelink semi persistent scheduling (SPS) configuration information. Here, the Sidelink SPS configuration information may include at least one Sidelink SPS configuration index and an SPS period for each of the at least one Sidelink SPS configuration index. Furthermore, the information receiver 1510 may have the function of receiving downlink control information including activation information. Here, the activation information may indicate an activated specific SPS configuration index among the at least one Sidelink SPS configuration index.

The communication performance unit 1520 may have the function of performing the PSCCH transmission based on the Sidelink SPS configuration information and the downlink control information.

The description for the device included in the processor described above is just an example, but the processor may further include another functional element or device. In addition, a particular example for the operation performed by each functional device may be as described above, and accordingly, a repeated description is omitted.

What is claimed is:

1. A method for performing a physical sidelink control channel (PSCCH) transmission in a wireless communication system, the method performed by a mode 3 User Equipment (UE) and comprising:

receiving, from a base station, a Sidelink semi persistent scheduling (SPS) configuration;

receiving, from the base station, downlink control information activating the Sidelink SPS configuration; and
performing the PSCCH transmission based on the Sidelink SPS configuration and the downlink control information,
wherein the mode 3 UE performs a vehicle to X (V2X) operation on at least one resource scheduled by the base station,
wherein the mode 3 UE receives, from the base station, configuration information for the mode 3 UE,
wherein the configuration information is information related to a sensing measurement performed by the mode 3 UE,
wherein the configuration information includes a sensing periodicity used for performing the sensing measurement by the mode 3 UE,
wherein the configuration information includes a value of a resource reselection counter used for performing the sensing measurement by the mode 3 UE,
wherein the mode 3 UE performs the sensing measurement during a sensing window based on the configuration information; the sensing periodicity and the value of the resource reselection counter, and
wherein the mode 3 UE transmits, to the base station, a result of the sensing measurement.

2. The method of claim 1, wherein the configuration information is received from the base station through radio resource control (RRC) signaling.

3. The method of claim 1, wherein the downlink control information is received from the base station, and
wherein the downlink control information is downlink control information (DCI) format 5A.

4. The method of claim 1, wherein the mode 3 UE transmits, to the base station, the result of the sensing measurement on a resource pool in which at least one first resource and at least one second resource is coexisted.

5. The method of claim 4, wherein the at least one first resource is the at least one resource scheduled by the base station, and
wherein the at least one second resource is at least one resource selected from a pool of resources.

6. The method of claim 1, wherein the mode 3 UE is different from a mode 4 UE,
wherein the mode 4 UE performs the V2X operation on at least one resource which is selected by the mode 4 UE from a pool of resources.

7. A mode 3 User Equipment (UE) for performing a physical sidelink control channel (PSCCH) transmission, comprising:
a transceiver for transmitting and receiving a radio signal; and
a processor operatively coupled to the transceiver,
wherein the processor is configured to:
control the transceiver to receive, from a base station, a Sidelink semi persistent scheduling (SPS) configuration;
control the transceiver to receive, from the base station, downlink control information activating the Sidelink SPS configuration; and
perform the PSCCH transmission based on the Sidelink SPS configuration and the downlink control information,
wherein the mode 3 UE performs a vehicle to X (V2X) operation on at least one resource scheduled by the base station,
wherein the mode 3 UE receives, from the base station, configuration information for the mode 3 UE,
wherein the configuration information is information related to a sensing measurement performed by the mode 3 UE,
wherein the configuration information includes a sensing periodicity used for performing the sensing measurement by the mode 3 UE,
wherein the configuration information includes a value of a resource reselection counter used for performing the sensing measurement by the mode 3 UE,
wherein the mode 3 UE performs the sensing measurement during a sensing window based on the sensing periodicity and the value of the resource reselection counter, and
wherein the mode 3 UE transmits, to the base station, a result of the sensing measurement.

* * * * *

UNITED STATES PATENT AND TRADEMARK OFFICE
CERTIFICATE OF CORRECTION

PATENT NO. : 10,993,263 B2
APPLICATION NO. : 16/578009
DATED : April 27, 2021
INVENTOR(S) : Seungmin Lee Page 1 of 1

It is certified that error appears in the above-identified patent and that said Letters Patent is hereby corrected as shown below:

Column 29, Line 22, Claim 1, delete "the configu-"

Column 29, Line 23, Claim 1, delete "ration information;"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*